United States Patent
Reed et al.

(10) Patent No.: US 8,255,471 B2
(45) Date of Patent: Aug. 28, 2012

(54) SYSTEM AND METHOD FOR MESSAGE PROCESSING AND ROUTING

(75) Inventors: Carl J Reed, Hoboken, NJ (US); Michael R Marzo, Millington, NJ (US); Tomozumi Kanayama, New York, NY (US); Konstantin A Krasheninnikov, Union City, NJ (US); Julien George Beguin, New York, NY (US)

(73) Assignee: Goldman, Sachs & Co., New York, NY (US)

( * ) Notice: Subject to any disclaimer, the term of this patent is extended or adjusted under 35 U.S.C. 154(b) by 0 days.

(21) Appl. No.: 13/012,352

(22) Filed: Jan. 24, 2011

(65) Prior Publication Data

US 2011/0125859 A1    May 26, 2011

Related U.S. Application Data

(60) Continuation of application No. 12/080,727, filed on Apr. 4, 2008, now Pat. No. 7,899,931, which is a division of application No. 10/427,516, filed on May 1, 2003, now abandoned.

(51) Int. Cl.
*G06F 15/16* (2006.01)
*G06F 15/173* (2006.01)

(52) U.S. Cl. ........................ 709/206; 709/238

(58) Field of Classification Search .................. None
See application file for complete search history.

(56) References Cited

U.S. PATENT DOCUMENTS

| | | | |
|---|---|---|---|
| 5,680,551 A | 10/1997 | Martino, II | |
| 6,216,173 B1 | 4/2001 | Jones et al. | |
| 6,256,676 B1 | 7/2001 | Taylor et al. | |
| 6,760,911 B1 | 7/2004 | Ye | |
| 7,050,432 B1 | 5/2006 | Banavar et al. | |
| 7,051,334 B1 | 5/2006 | Porter et al. | |
| 7,216,181 B1 | 5/2007 | Jannu et al. | |
| 7,328,242 B1 | 2/2008 | Mccarthy et al. | |
| 7,349,980 B1 | 3/2008 | Darugar et al. | |

(Continued)

FOREIGN PATENT DOCUMENTS

WO    WO99/07104    2/1999

OTHER PUBLICATIONS

Enterprise Transaction Express White Paper, TIBCO, http://web.archive.org/web/19980629095033/http://www.tibco.com/products/etxwhite.html (archive.org states archive date of Jun. 29, 1998).

(Continued)

*Primary Examiner* — John B. Walsh
(74) *Attorney, Agent, or Firm* — Perkins Coie LLP

(57) ABSTRACT

A message routing system that allows applications at either end of the system to run as-is without modification. The system functions in a multithreaded environment and is capable of handling complex routing rules and message transformation. It is also capable of learning and executing new routing rules and message transformations in formats previously unrecognized by the system. The system enables precise and reliable logging of messages throughout processing and supports publication of enterprise-wide broadcast messages. The system further preferably employs cooperating inbound and outbound transport processes for consuming, routing, processing, safely storing and publishing messages in batches of logical units of work to ensure that the logical units of work are not lost in system transactions. The system also preferably utilizes a replay server for preserving and replaying messages that might otherwise fail to reach their intended destinations.

12 Claims, 13 Drawing Sheets

U.S. PATENT DOCUMENTS

| | | |
|---|---|---|
| 7,406,537 B2 | 7/2008 | Cullen |
| 7,596,606 B2 | 9/2009 | Codignotto |
| 7,899,931 B2 * | 3/2011 | Reed et al. .................... 709/238 |
| 2003/0115291 A1 | 6/2003 | Kendall et al. |
| 2003/0185379 A1 | 10/2003 | O'Connor et al. |
| 2003/0225857 A1 | 12/2003 | Flynn et al. |
| 2004/0117801 A1 | 6/2004 | Eibach et al. |
| 2004/0223491 A1 | 11/2004 | Levy-Abegnoli et al. |
| 2005/0188027 A1 | 8/2005 | Clarke et al. |
| 2007/0005613 A1 | 1/2007 | Singh et al. |

OTHER PUBLICATIONS

MQSeries Primer, IBM, Dieter Wackerow, http://www.redbooks.ibm.com/redpapers/pdfs/redp0021.pdf (document states Oct. 1999).

* cited by examiner

SYSTEM AND METHOD FOR MESSAGE PROCESSING AND ROUTING

CROSS REFERENCE TO RELATED APPLICATION

This is a Continuation of prior U.S. patent application Ser. No. 12/080,727, filed Apr. 4, 2008, entitled, "SYSTEM AND METHOD FOR MESSAGE PROCESSING AND ROUTING," to which priority under 35 U.S.C. §120 is claimed, and which is a divisional of and claims the benefit under 35 U.S.C. §120 of U.S. patent application Ser. No. 10/427,516, entitled "SYSTEM AND METHOD FOR MESSAGE PROCESSING AND ROUTING," filed May 1, 2003. The contents of the aforementioned applications are incorporated herein by reference in their entirety.

FIELD OF THE INVENTION

The present invention relates to a messaging system and method for processing and routing messages in a computer network environment.

BACKGROUND OF THE INVENTION

In a computing environment where large amounts of data are moved between various locations, for example in connection with stock trading, it is desirable to move the data as efficiently as possible. One early method for doing so, as illustrated in FIG. 1, was to transfer the data from a main data source 100 as a whole data file 102 via File Transfer Protocol (FTP) to routers 110, 112, 114 located in different areas where the data would need to be distributed. (The geographic locations noted in FIG. 1 are for illustrative purposes only, to show how widely dispersed the data destinations may be.)

Each of the routers 110, 112, 114 contains a local network file server that parses the data file 102 and generates a plurality of smaller data files 116, which are distributed to local destinations 120a, 120b, 122a, 122b, 124a, 124b. The number of local destinations shown in FIG. 1 can be any number of destinations that need to access data from the file 102.

There are two major disadvantages to the arrangement shown in FIG. 1. First, the data is not sent in real time, leading to an undesired delay in processing the data. Second, the entire data file 102 had to be sent to multiple locations 110, 112, 114 in order to be distributed to the ultimate destinations 120a-124b, resulting in large amounts of unnecessary computer network traffic. Because of these disadvantages, the data file 102 was actually parsed and divided multiple times, as opposed to as few as once, thereby creating a process that was inefficient, processor intensive, and not in real time.

In a setting like stock trading, access to data in real time is critical in order to be able to make the best possible trades at a given point in time. In an effort to overcome the inefficiencies using an FTP-based data transfer, a similar arrangement was used on top of a messaging platform which could distribute the data in real time, as shown in FIG. 2.

Modern computer networks are rarely homogeneously constructed; they are often a collection of old and new systems from a variety of vendors and operate on a variety of platforms. Across an enterprise, it is critical that the disparate parts of a computer network communicate with each other in some form. One solution to this problem is to utilize a messaging platform that runs across various systems while providing a common message format. A common messaging platform typically involves a publish-subscribe metaphor, in which information is published to a particular subject or topic, and any party interested in receiving that information subscribes to that subject (this may also be referred to as consuming off a particular subject). In this environment, a consumer only receives information that is of interest; any other, non-relevant information is not published to the subject. Examples of such a messaging platform include ETX from TIBCO Software, Inc. and as MQ Series from International Business Machines Corporation.

To route the data to its final destination, it must be published to a subject that the destination subscribes to. Since there is some overhead in terms of time in determining the proper subject on which to publish a message, a message can be published to a "general" subject and the specific subject of the message can be determined thereafter. One solution to this problem is to use a router to examine the message and to determine the specific topic on which the message should be published.

As shown in FIG. 2, a data source 200 publishes messages 202, all of which are consumed by a general data router (GDR) 210. The router 210 parses the messages 202 and publishes the parsed messages on new subjects 212, 214, 216, which are destined for second-level routers 220, 222, 224, respectively. The second-level routers 220, 222, 224 examine the message a second time, and republish the message on a specific subject 226 for a particular end destination 230a, 230b, 232a, 232b, 234a, 234b.

The router 210 parses a message 202 by examining the contents of the message 202, evaluating a particular key contained within the message 202, and based upon the value of the key, determines the proper second-level router 220, 222, 224 to which it should publish the message 202. The second-level routers 220, 222, 224 examine the message in the same manner as the router 210, but with a finer level of granularity, in order to determine the specific destination 230a-234b for the message. Simply stated, the message 202, when published, does not have a destination address associated with it, but that address can be built dynamically by the routers 210 and 220, 222, or 224, by looking up what is in the message 202, building the address for the message 202, and publishing the message 202 to its final destination 230a-234b.

One of the goals in using a messaging platform and the multiple routers is to extract some of the complexity from both the publisher and the consumer and placing that logic into a centralized layer, such that it is essentially considered by both end publishers and end consumers to be part of the messaging platform. This is one of the focus points of enterprise application integration (EAI), making it easier for disparate systems to communicate with one another. By placing the routing logic in a centralized location, the administration of the logic is simplified, since only one location needs to be updated when changes are made.

In order to simplify what a particular second-level router 220, 222, 224 needs to understand, it can be specified what is unique about an instance of the application that can be found in the message. But there is still the problem, from the publisher's (200) perspective, of how to identify which specific destination 230a-234b to send the message. In a publish-subscribe environment, this problem is solved by publishing to a subject subscribed to by the specific destination. If the router 210 was not present, each of the second-level routers 220, 222, 224 would need to discard any messages that were not intended for them; this would merely replicate one of the disadvantages of using FTP as noted above, but in connection with a messaging platform. The router 210 helps to reduce the amount of unnecessary data traffic by reducing the number of messages that need to be sent. Ideally, no message is duplicated, nor is a message sent to more than one location.

One disadvantage of this use of the messaging platform is that there are multiple instances of routers operating at the same time, which creates management issues of having to coordinate several pieces of software. While the routers are executing the same code base, each router is applying different routing rules, depending upon the router's location in the message flowpath. Furthermore, each router is only able to apply one routing rule. To apply multiple routing rules to one message, multiple routers need to be arranged in sequence, necessarily creating a complicated network design. The design shown in FIG. 2 is also a single thread of execution, which limits the throughput of the routing system to about 35 messages per second (assuming an average message size of two kilobytes). In the example noted above of a large stock trading system, a real-time flow of data easily exceeds 35 messages per second.

It is desirable to create a routing system that utilizes a single application to execute multiple routing rules on a single message, that is multithreaded in order to increase the throughput of the system, and is messaging platform agnostic such that disparate messaging platforms can be used on either side of a publish-subscribe or a point-to-point transaction.

FIG. 3 shows how a single router of the prior art operates while processing a message. A router 300 accepts an inbound message 302, processes the inbound message 302 and outputs an outbound message 304. The contents of the inbound message 302 and the outbound message 304 are going to be identical. The goal of the router 300 is to examine the contents of the inbound message 302, which is published to a general subject, and from those contents determine the specific subject on which the outbound message 304 should be published for consumption by the ultimate recipient of the outbound message 304.

The inbound message 302 is first examined at block 310, where an introspection module is called. The particular introspection module to be called is dependent upon the subject of the inbound message 302 and is retrieved from an introspection module library 312. An introspection module (a/k/a key extraction routine) is a customized routine that complies with a particular interface. It can be loaded dynamically according to a configuration of a particular routing instance and it contains the logic for examining a specific type of message. This code will read the inbound message 302 and extract the information needed to determine how to route the message 302 to the proper specific subject, namely a routing key. The information to be extracted and used as the routing key is defined in the introspection module, which is why a different introspection module is required for each different routing rule to be applied. For example, in the stock trade example, the account number associated with the trade can be used as the routing key.

At block 320, the routing key is extracted from the inbound message 302 and the value of the routing key is evaluated. This value is matched against a keymap table 322 to determine the routing tag or target for the inbound message 302. The keymap table 322 is a two column table that lists the values of the routing key in one column and the matching routing tags for those values in another column. Because the router 300 can only operate on one routing rule, the keymap table 322 will be the same for all inbound messages 302. The data in the keymap table 322 can be cached locally within the router 300 for rapid access to the data. During the initialization of the router 300, the keymap table 322 is loaded into the router's memory from an external routing information database 324.

Once the routing tag of the inbound message 302 has been identified, at block 330, the routing tag is used to access an outbound routing table 332 to identify the outbound subject for the inbound message 302. The outbound routing table 332 is a two column table that lists the values of the routing tag in one column and the outbound subjects for those values in another column. As with the keymap table 322, the outbound routing table 332 can be cached in local memory during the initialization of the router 300 by loading the outbound routing table 322 from the routing information database 324. In block 340, the inbound message 302 is published to the new subject as outbound message 304.

FIG. 4 shows how the prior art applied multiple routing rules to a single inbound message 400. Because each router of the prior art was only capable of applying a single rule, it was necessary to string multiple routers together to be able to apply multiple rules to a single message. (The concept of multiple routing rules will be discussed below in connection with FIG. 5.) As shown in FIG. 4, an inbound message 400 is examined by a first router 410, which applies a first rule to the inbound message 400 and then, if the inbound message 400 meets the criteria of the first rule, publishes the inbound message 400 as an outbound message 412 for a first consumer 414. The inbound message 400 is then passed to a second router 420, which applies a second rule to the inbound message 400 and then, if the inbound message meets the criteria of the second rule, publishes the inbound message 400 as an outbound message 422 for a second consumer 424, and so on.

Some solutions to the general problems posed by the complexities of enterprise application integration have been proposed by various U.S. patents. For example, U.S. Pat. No. 6,256,676 to Taylor et al. relates to a system for integrating a plurality of computer applications, including an adapter configured for each of the applications, the adapter controlling the communication to and from the associated application. The system of Taylor et al. permits communication across a variety of different messaging modes, including point-to-point, publish-subscribe, and request-reply messaging, utilizing message definitions for each type of object to be passed through the system. A number of different types of adapters are required for each application, and for each message definition. While the architecture of this system permits flexibility in system construction, it requires a significant amount of work by the user to properly construct the system. This system adapts to the applications to be connected, rather than requiring the applications to adapt themselves to the system.

U.S. Pat. No. 5,680,551 to Martino, II describes a system for connecting distributed applications across a variety of computing platforms and transport facilities. To implement this system, it is necessary to modify each of the applications to be connected to include the basic operating core (i.e., the application programming interface) of the system. This system does not support a publish-subscribe messaging platform, and any application desiring to receive messages must actively seek out new messages. In order to use this system, a messaging user interface to each application is designed, then the messaging system is integrated into each application to be connected, and finally the system is configured and tested. Following these steps for each application to be connected is both labor-intensive and time-intensive.

In regard to content processing and routing, U.S. Pat. No. 6,216,173 to Jones et al. discloses a method and apparatus for incorporating such intelligence into networks. The system of Jones et al. associates attributes with each service request which allows the system to obtain knowledge about the content and requirements of the request. Using this knowledge, along with knowledge of the available services, the system can route the request to a suitable service for processing. This system also permits communication across disparate networks, by converting the data for transmission across each type of network. The conversion process occurs while the data is being sent from, for example, Node A to Node C. An intermediate stop is made at Node B to convert the data from the format at Node A to the format at Node C. The data conversion occurs during the routing process, not once routing is completed.

While these patents address various problems existing in the prior art, none contemplate use of a single application to handle all of the routing, allowing the applications at either end of a publish-subscribe or a point-to-point messaging system to run as-is without modification, and to run in any messaging environment regardless of the specifics of the messaging platform (i.e., to be messaging system agnostic).

SUMMARY OF THE INVENTION

The present invention provides an efficient routing system and method that runs in any publish-subscribe or point-to-point messaging environment regardless of the specifics of the messaging platform and that allows applications at either end of the routing system to run as-is without modification. The system functions in a multithreaded environment and is capable of handling complex routing rules and message transformation. It is also capable of learning and executing new routing rules and message transformations that may be required by new users of the system whose message consumption requirements may be in formats previously unrecognized by the system. The system enables precise and reliable logging of messages throughout processing and supports publication of enterprise-wide broadcast messages. The system further preferably employs cooperating inbound and outbound transport processes for consuming, routing, processing, safely storing and publishing messages in batches of logical units of work to ensure that the logical units of work are not lost in system transactions. The system also preferably utilizes a replay server for preserving and replaying messages that might otherwise fail to reach their intended destinations because of router or application error or failure.

BRIEF DESCRIPTION OF THE DRAWINGS

For a better understanding of the present invention, reference is made to the following detailed description of an exemplary embodiment considered in conjunction with the accompanying drawings, in which.

DETAILED DESCRIPTION OF THE INVENTION

Figure 5:
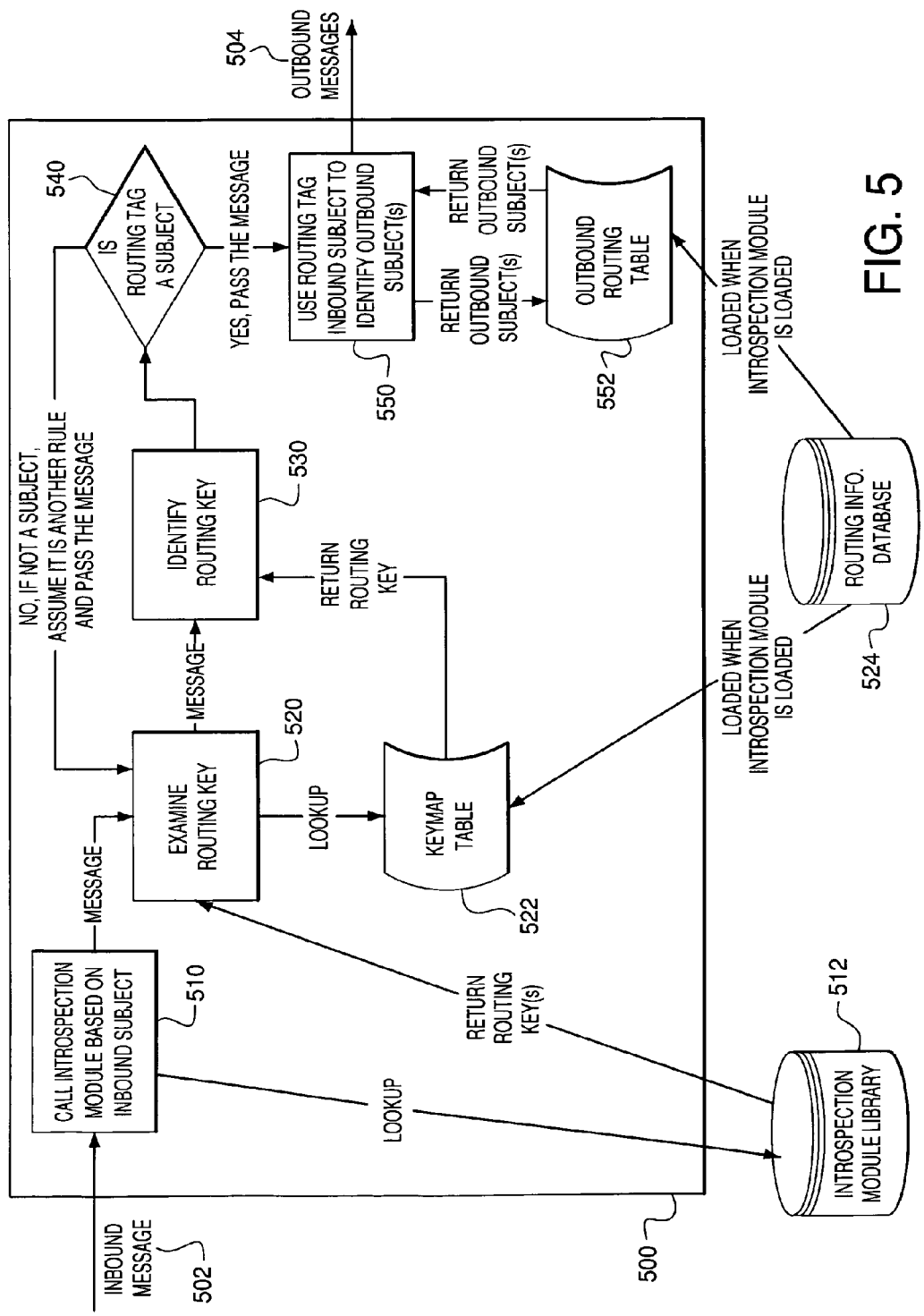
FIG. 5 is a flow diagram of a routing system constructed in accordance with the present invention.

Referring now to FIG. 5, the routing system of the present invention comprises a router 500 that accepts or consumes an inbound message 502, processes the inbound message 502 and outputs one or more outbound messages 504. The router 500 examines the contents of the inbound message 502, which is published to a general subject, and from those contents determines the specific subject(s) on which the outbound message(s) 504 should be published for consumption by the ultimate recipient(s) of the outbound message(s) 504. Although described herein as it might be used in connection in a publish-subscribe messaging environment, the routing system and method of the present invention also finds beneficial application in a point-to-point messaging environment.

Multithreaded Execution

Figure 1:
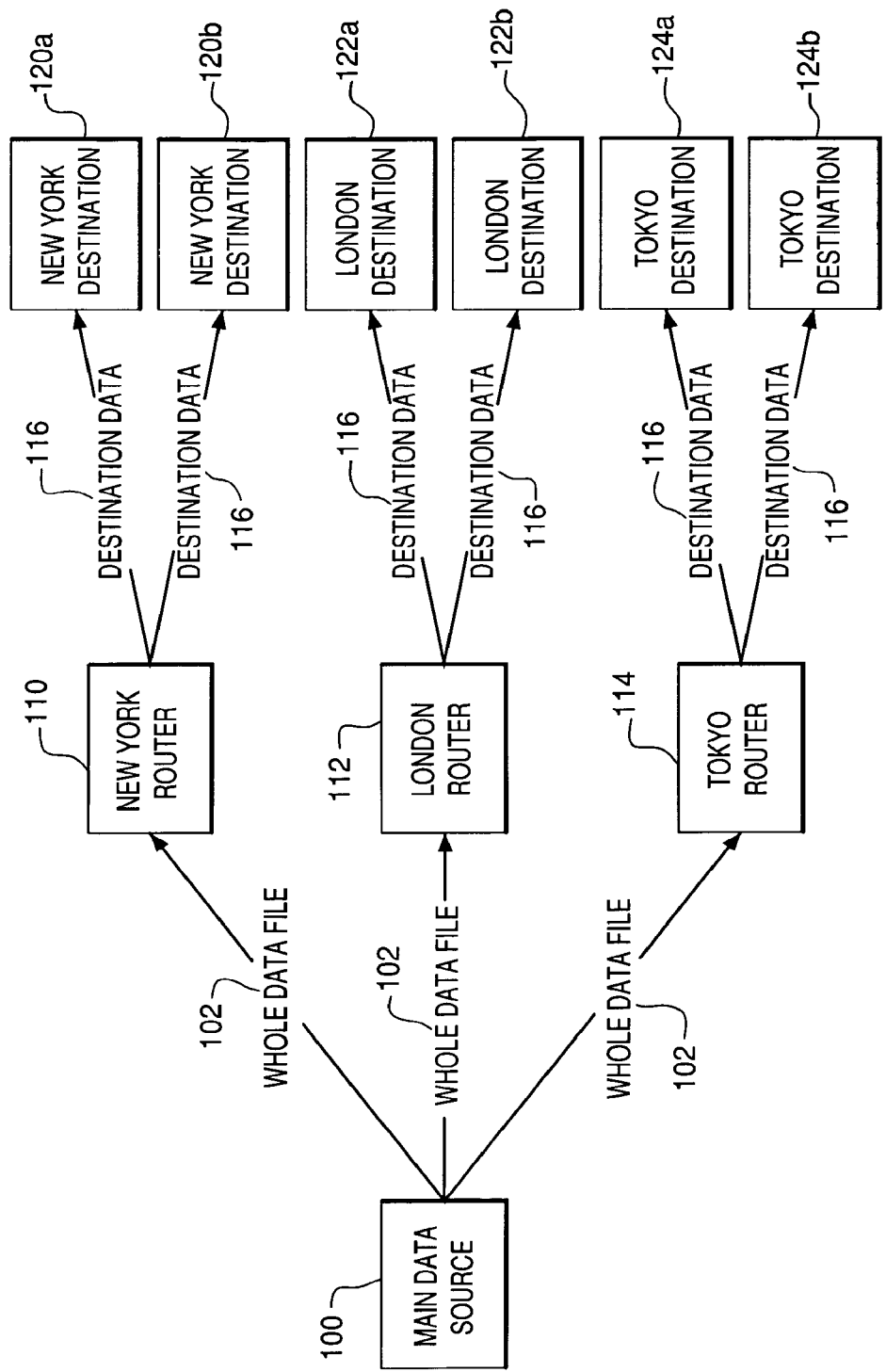
FIG. 1 is a diagram showing a prior art data transfer system operating under File Transfer Protocol.
Figure 2:
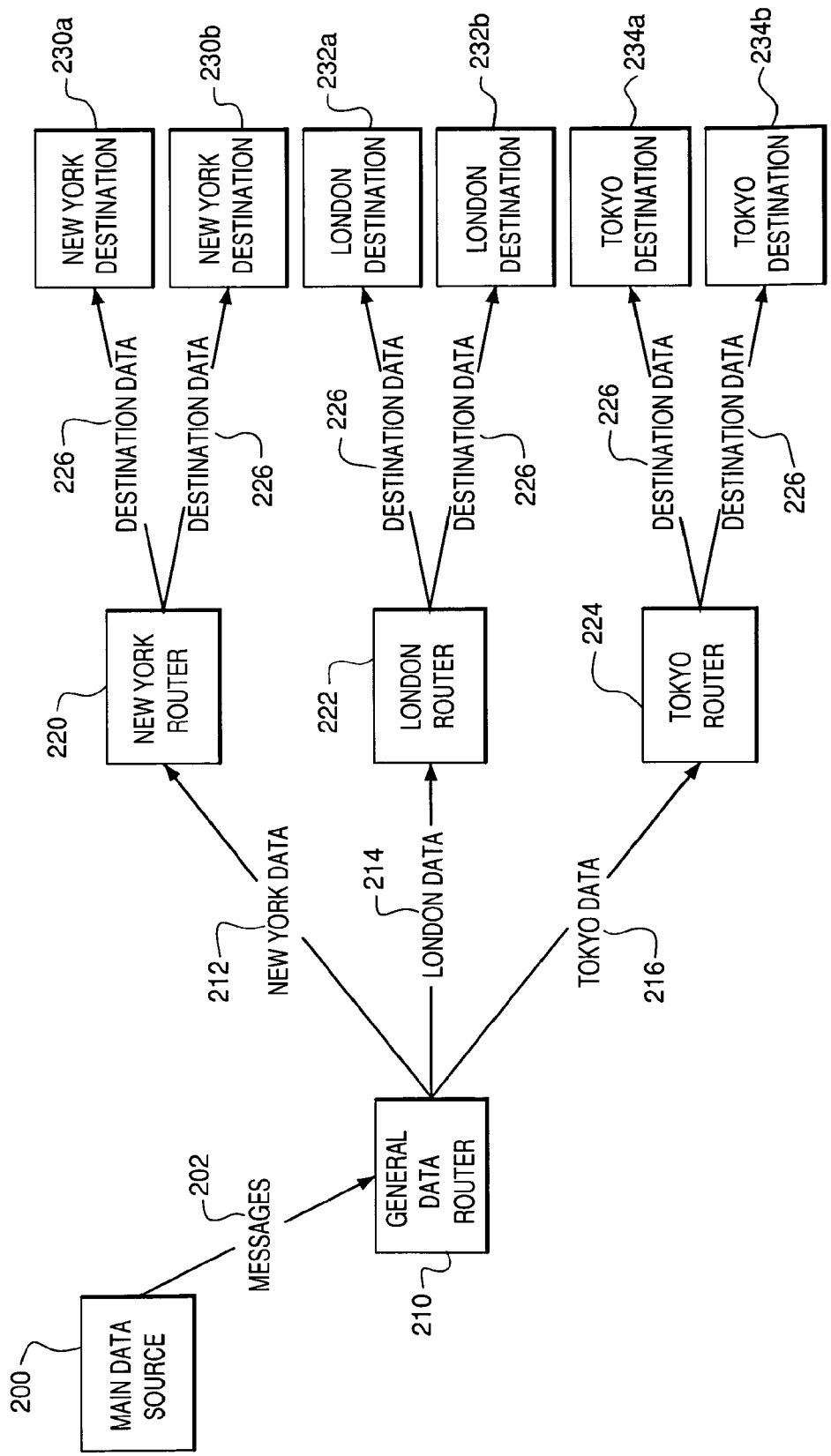
FIG. 2 is a diagram showing a prior art data transfer system operating as a single-threaded application on a messaging platform.
Figure 3:
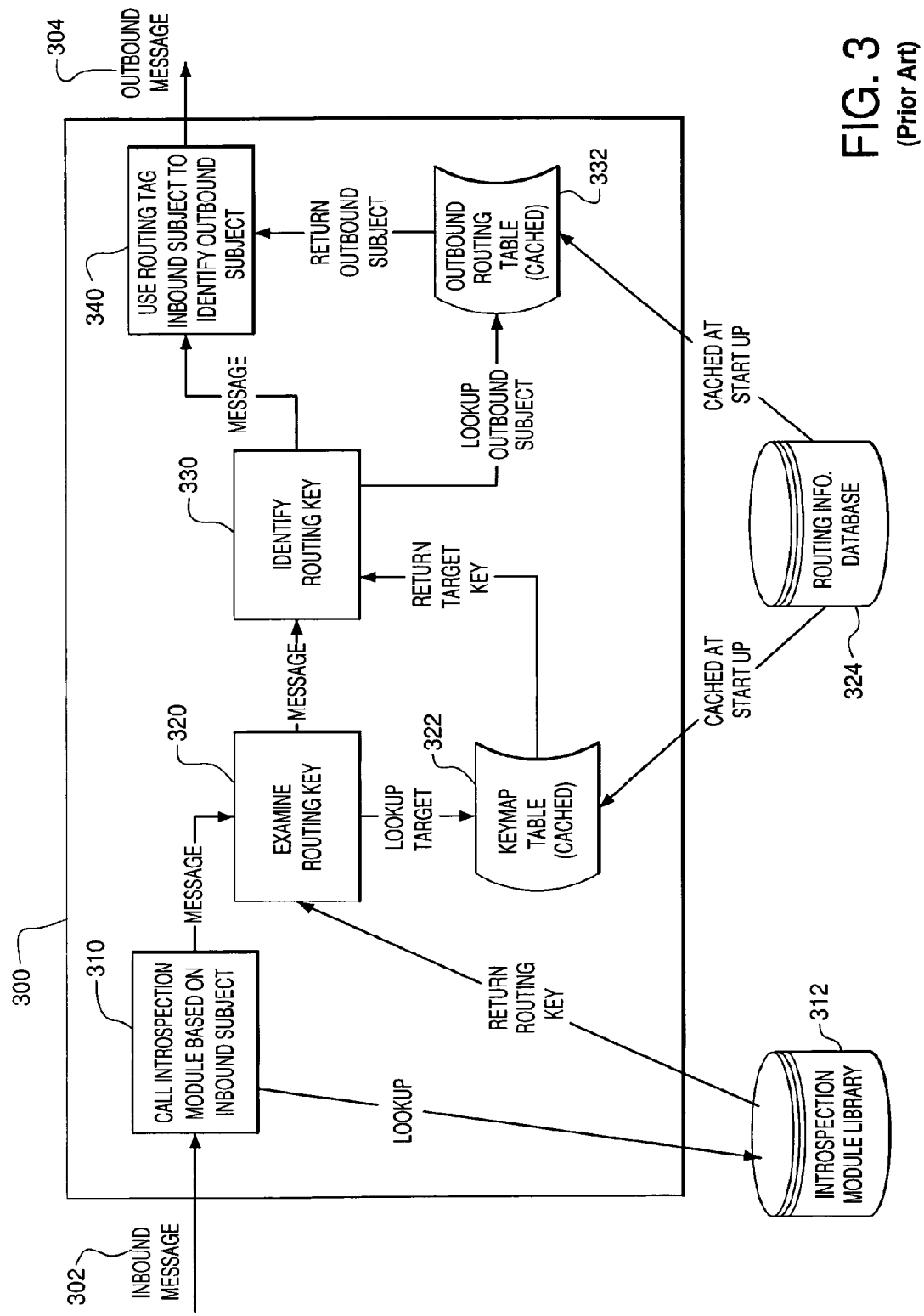
FIG. 3 is a flow diagram of a prior art router, showing how the router processes a message.
Figure 4:
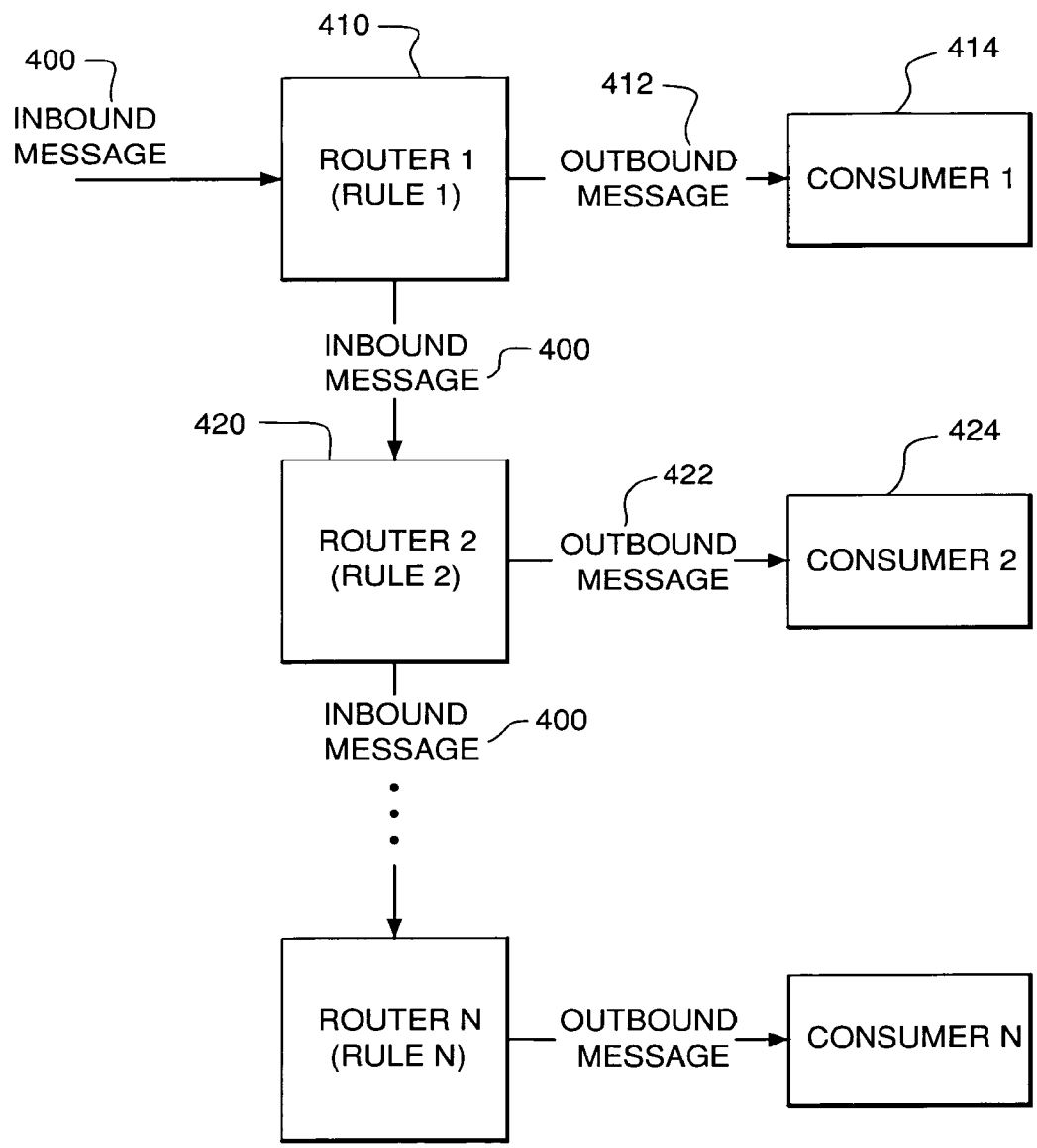
FIG. 4 is a block diagram showing how the prior art applied multiple routing rules to a single message.

The router 500 preferably operates in a multithreaded environment. For a router to be able to operate as a multithreaded application, the underlying messaging platform must also be multithreaded. In the prior art, as discussed above in connection with FIG. 3, the messaging platform was operating on only a single thread of execution. In such circumstances, in order to achieve a higher throughput of messages, it was necessary to instantiate a plurality of routers, each running as a separate application, i.e., threading by instance. However, as the number of instances of the router application concurrently executing increases, the overhead associated with managing all of those instances becomes complicated, and ultimately, the performance of the overall system will suffer due to the excessive overhead.

It would be preferable to thread the router in a multi-threaded architecture, whereby multiple threads would be operating in the same process space, lowering the overhead required to manage multiple concurrently executing threads. The messaging platform on which the present invention executes should be a multithreaded and at least the client library of the messaging platform multithread-safe. But, having a multithreaded architecture does not necessarily mean that the system cannot be also threaded by instance to increase the overall throughput.

The router 500 may operate, for example, on an ETX 3.2 or other ETX messaging platform from Tibco Software. However, at this juncture it should be made clear that while the present invention is described in connection with an ETX messaging platform it may also find beneficial use with other multithreaded messaging platforms as well, including, without limitation, the IBM MQ Series messaging platform. Indeed, as will be described in greater detail later herein, the present system is capable of accommodating messages that are published and consumed by disparate messaging platforms.

Continuing, when the client library of a messaging platform (the actual portion that communicates with a broker/node) reaches maximum throughput capacity of approximately ten threads, the performance of the router eventually begins to slow down due to the thread management overhead. When such a condition is reached, it may be necessary to create another instance of the router 500 in order to handle the message traffic. Once the new instance of the router 500 is created, the message traffic can be distributed between the multiple instances of router 500 to maximize the throughput of all of the instances presently running.

The maximum throughput of an ETX node is approximately 200 messages per second (again, assuming an average message size of two kilobytes). When that threshold is reached, it would be necessary to have more than one node/broker running. On the other hand, if maximum throughput of a routing instance has been reached, e.g., multiple nodes operating at or near capacity on a single routing instance, it would be necessary to instantiate additional instances of the router. In this manner, layers of transport brokers/nodes and routing instances can be added to reach a desired performance quota, which is then only limited by physical limitations such as machine, hardware, or network bottlenecks that cannot be circumvented without buying new equipment. In a preferred embodiment, the desired throughput for the system is approximately 150 messages per second (again, assuming an average message size of two kilobytes), which should sufficiently perform on one ETX node.

An additional problem encountered when dealing with a singly-threaded router is that each instance of that router operates in the same manner. By definition, this is what would occur if multiple instances of the same application were used; each instance would be expected to operate in the same manner. The key issue with that is, apart from the fact that there are several different application processes to manage, that all of the process are essentially performing the same operations. Each process is potentially caching the same routing data and each process is, again by definition, applying the same business logic for routing messages. This becomes problematic when the user wants to change an aspect of the routing, because there are several processes that need to be changed in order to do so.

The real difficulty arises in coordinating those changes across all of the different processes, because all of the processes need to be in a consistent state at all times to avoid an error condition. In other words, if a message is in the middle of being processed and the router that is performing the processing is updated, a routing error may occur. Because multiple applications may be involved and/or dependent upon a single message being processed in a particular way, it is necessary to ensure that all of the applications relying on that message operate in a consistent manner. Attempting to coordinate several disparate applications can be difficult on its own because there needs to be some sort of management protocol involved in the communication between the applications. Even though each different process space is executing the same application, there is nothing that binds those process spaces together.

By utilizing a multithreaded architecture, the method of making changes to the system is simplified by having only one location where the changes need to be made, and those changes can be propagated to the other threads of execution. Furthermore, the overall system architecture is neater in the context of managing multiple instances of the same routing logic, and perhaps more importantly, not having to manage multiple instances of the routing data. For example, if there is a large cache associated with the routing logic in each instance of the router, the cache would need to be instantiated the same number of times as there are routers, because each router would be operating in a separate process space. However, if the router were multithreaded, the cache would only need to be instantiated once for each router, thereby minimizing the overhead associated with managing multiple instances of the cache.

Referring back to FIG. 5, the inbound message 502 is first examined at block 510, where an introspection module or key extraction routine is called. The particular introspection module to be called is dependent upon the source of the inbound message 502 and is retrieved from an introspection module library 512 and dynamically loaded based upon the routing configuration of a particular routing instance. As mentioned previously, an introspection module is a customized routine that contains the logic for handling a specific type of message. This code will read a message and extract the information needed to determine how to route the inbound message 502 to the proper specific subject, namely a routing key. When the router 500 is applying multiple routing rules to a single inbound message 502, different key extraction routines might be evoked multiple times in sequence. The implementation of how the router 500 handles multiple routing rules will be discussed in greater detail below.

At block 520, a routing key is extracted from the inbound message 502, and the value of the routing key is evaluated. This value is matched against a keymap table 522 to determine a routing tag for the inbound message 502. The keymap table 522 is a two column table that lists the values of the routing key in one column and the matching routing tags for those values in another column. The data in the keymap table 522 is cached locally within the router 500 for rapid access to the data. When the introspection module is loaded from the introspection module library 512, the keymap table 522 is loaded into the memory of the router 500 from an external routing information database 524.

Once a routing tag for the inbound message 502 has been identified, at block 530, the routing tag is evaluated at block 540 to determine whether the routing tag is bound to a publication/outbound subject, another rule or both. If the tag is bound to a subject, then control is passed to block 550, where the subject is used to access an outbound routing table 552 to identify the outbound subject for the inbound message 502. The outbound routing table 552 is a two column table that lists the values of the routing tag in one column and the outbound subjects for those values in another column. As with the keymap table 522, the outbound routing table 552 is cached in local memory when the introspection module is loaded from the introspection module library 512 by loading the outbound routing table 552 from the routing information database 524. Once the outbound subject has been retrieved at block 550, the inbound message 502 is published to the new subject as an outbound message 504.

If the routing tag evaluated at block 540 is not a subject, it must be another routing rule to be applied to the inbound message 502. Control is then passed back to block 520, where the inbound message is evaluated against the next rule in a similar manner as previously described. It is through this type of evaluation mechanism that multiple routing rules can be applied to a single inbound message 502, and thereby produce one or more outbound messages 504. The process from block 520 through block 540 is repeated for each routing rule that is contained in the introspection module. The router 500 is designed to be flexible, in that an end user of the router 500 has great latitude in configuring how the routing rules operate and how they are applied. Cascading routing of this sort overcomes the problem of the prior art, which would have required the use of multiple routers to apply multiple rules to a single message.

It is possible to build additional functionality into the router 500 that would permit the router 500 to automatically extract the necessary routing keys from the inbound message 502. For instance, an inbound message 502 could be in a pre-defined format supported by router 500. Thus, an introspection module for that pre-defined format would not be necessary, since the router 500 would have the logic built-in to be able to parse that type of inbound message 502. In these circumstances, a publisher of a message in the pre-defined format would need to provide the routing tags used within the message format to represent the key values for that publisher's messages.

The router of the present invention assumes that the system designer has architected the enterprise network in such a way as to make the best use of the router and the system bandwidth. While the router has sufficient intelligence to route messages to various destinations, it cannot determine if there is a more efficient method of doing so. The router is reinforcing an underlying premise in the content-based routing arena, which is that a publisher does not send any information that is not required to any one consumer. So a publisher wants to be completely abstracted from who the consumers are, but a consumer does not want to have to throw away messages that it is not interested in.

The consumer only wants to receive messages that are of interest to it, without having to worry about any other messages. By definition, this means that when a message is published to a particular subject, that message is of complete interest to a consumer of that subject. Therefore, it is imperative upon the system architect to properly design the system to make the most efficient use of the available bandwidth. The router is completely agnostic to the architecture, in that it will function in the same manner regardless of the system it is utilized in.

From a general perspective, it is desirable to place the message routing as close to the publisher and as far from the consumer as possible. In such circumstances, message introspection becomes important, because a message can be initially published to a general subject, and then after the introspection occurs, can be published to the specific subject desired by a consumer. The driving concept behind placing the routing logic close to the publisher is to dispatch the message to its final destination as quickly as possible, thereby maximizing the efficiency of the overall network. The fewer times a single message is published to somewhere that is not its final destination, the less network traffic there is, and therefore, the network becomes more efficient.

Routing Example

The following example illustrates how the router of the present invention handles complex routing rules. In this example, the consuming topic is called US_AUTOMOBILES, and all messages in this topic are formatted using Extensible Markup Language (XML). The content of each message describes different makes, models, and characteristics of some common U.S.-produced automobiles and light trucks. The content of the messages shown in Table 1 below is provided to show the flexibility of the router of the present invention, and in no way reflects the actual attributes of any vehicle produced.

TABLE 1

Sample Messages.

| Inbound Message Sequence | Message Content |
|---|---|
| 1 | <msgClass>cars<make>chevrolet<style>sportUtility<model>blazer<color>blue<driveTrain>4wd<engine>V6... |
| 2 | <msgClass>cars<make>chevrolet<style>sportUtility<model>blazer<color>red<driveTrain>2wd<engine>V6... |
| 3 | <msgClass>cars<make>dodge<style>sportUtility<model>durango<color>red<driveTrain>4wd<engine>V8... |
| 4 | <msgClass>cars<make>dodge<style>sportUtility<model>durango<color>green<driveTrain>2wd<engine>V6... |
| 5 | <msgClass>cars<make>ford<style>sport Utility<model>explorer<color>blue<driveTrain>2wd<engine>V6... |
| 6 | <msgClass>cars<make>ford<style>sportUtility<model>explorer<color>green<driveTrain>4wd<engine>V8... |
| 7 | <msgClass>cars<make>ford<style>pickup<model>f250<color>red<driveTrain>4wd<engine>V8... |
| 8 | <msgClass>cars<make>dodge<style>roadster<model>viper<color>blue<driveTrain>2wd<engine>V10... |
| 9 | <msgClass>cars<make>chevrolet<style>gt<model>z28<color>white<driveTrain>2wd<engine>V8... |
| 10 | <msgClass>cars<make>chevrolet<style>pickup<model>1500<color>silver<driveTrain>4wd<engine>V6... |
| 11 | <msgClass>cars<make> chevrolet <style>roadster<model>corvette<color>green<driveTrain>2wd<engine>V8... |

Table 2 below depicts the various routing scenarios in this example that are to be applied to the messages shown above in Table 1.

TABLE 2

Routing Scenarios.

| Number | Scenario |
|---|---|
| 1 | Destination A wants V8 powered vehicles |
| 2 | Destination B wants pickups with 4wd |
| 3 | Destination C wants gt cars and roadsters |
| 4 | Destination D wants green sport utility vehicles with 4wd and V8 engines |
| 5 | Destination E wants red vehicles with 2wd |

Based upon the routing scenarios shown in Table 2, the following table shows the routing rules that exist in the router to be able to satisfy each scenario.

TABLE 3

Routing Rules.

| Destination | Engine tag | Style tag | DriveTrain tag | Color tag |
|---|---|---|---|---|
| A | V8 | | | |
| B | | pickup | 4wd | |
| C | | gt OR roadster | | |
| D | V8 | Sport Utility | 4wd | green |
| E | | | 2wd | red |

When applying each of the rules, all of the conditions specified by the rule must be satisfied in order for a message to be sent to a particular destination. This is an example of nested routing. Applying these rules to the inbound messages shown in Table 1 leads to the following results.

TABLE 4

Routing Results.

| Destination | Messages Received |
|---|---|
| A | 3, 6, 7, 9, 11 |
| B | 7, 10 |
| C | 8, 9, 11 |
| D | 6 |
| E | 2 |

When each rule shown in Table 3 is applied to a message in Table 1, the message is evaluated on a tag-by-tag basis to determine if there is a match. When the rules are nested (AS they are for all destinations except Destination A), all of the conditions specified by the rule must be met in order for a message to be published to the destination. As shown in Table 4, it is possible for the same message to be published to multiple destinations (i.e., Messages 6, 7, 9, and 11) and it is also possible that some messages may not be published at all (i.e., Messages 1, 4, and 5).

Message Replay

Large national and international businesses may publish and consume millions of electronic messages per day. In many businesses (such as, for example, brokerages involved in electronic financial and equities transactions), it is imperative that the transactions be processed on a first-in, first-out (FIFO) basis. According to a preferred embodiment, the routing system according to the present invention can provide such FIFO transaction processing. As reflected in FIGS. 6A and 6B, this can be done in two ways.

Figure 6A:
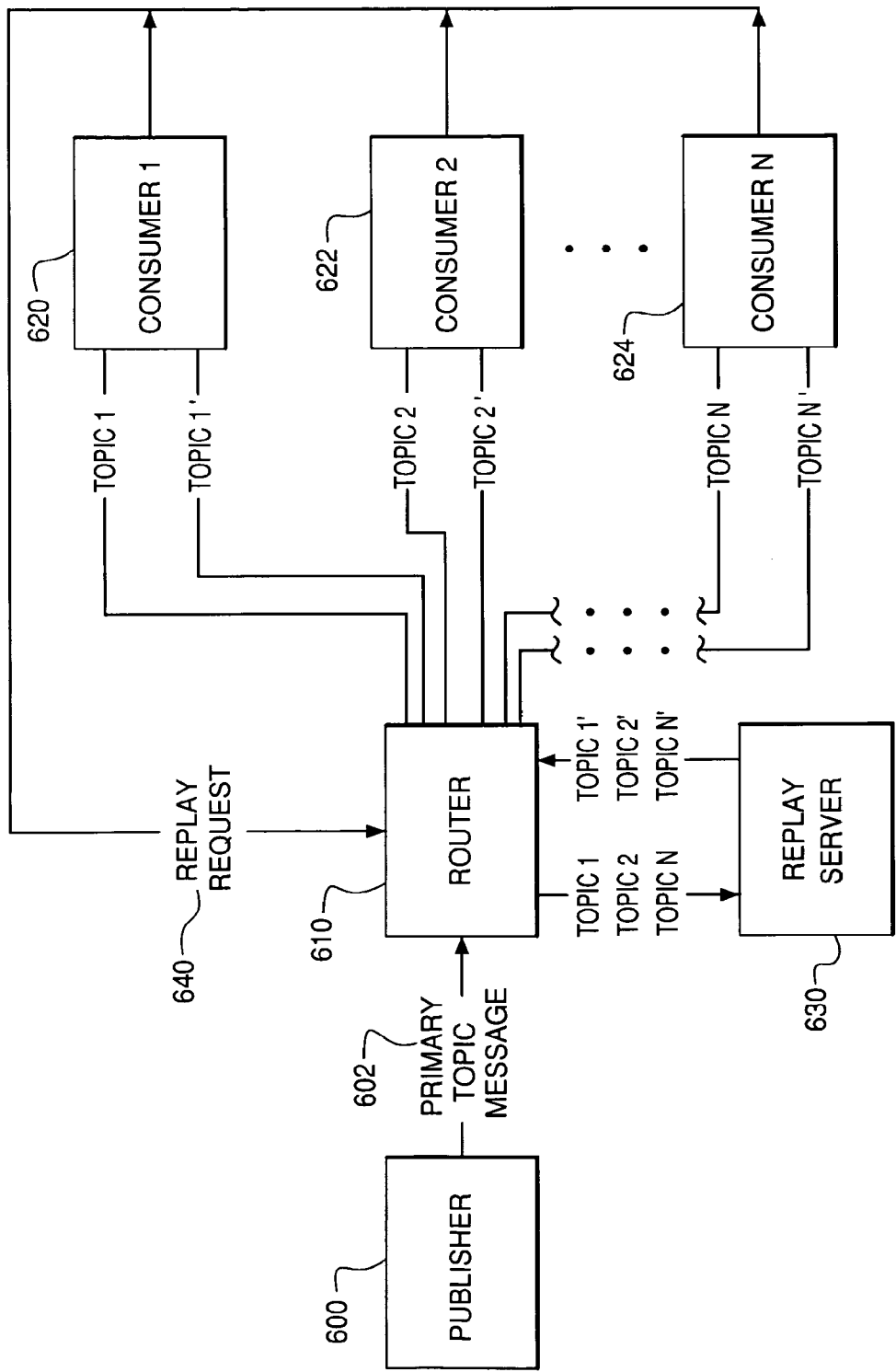
FIG. 6A is a diagram of a first embodiment of a message replay scheme of the routing system according to the present invention.
Figure 6B:
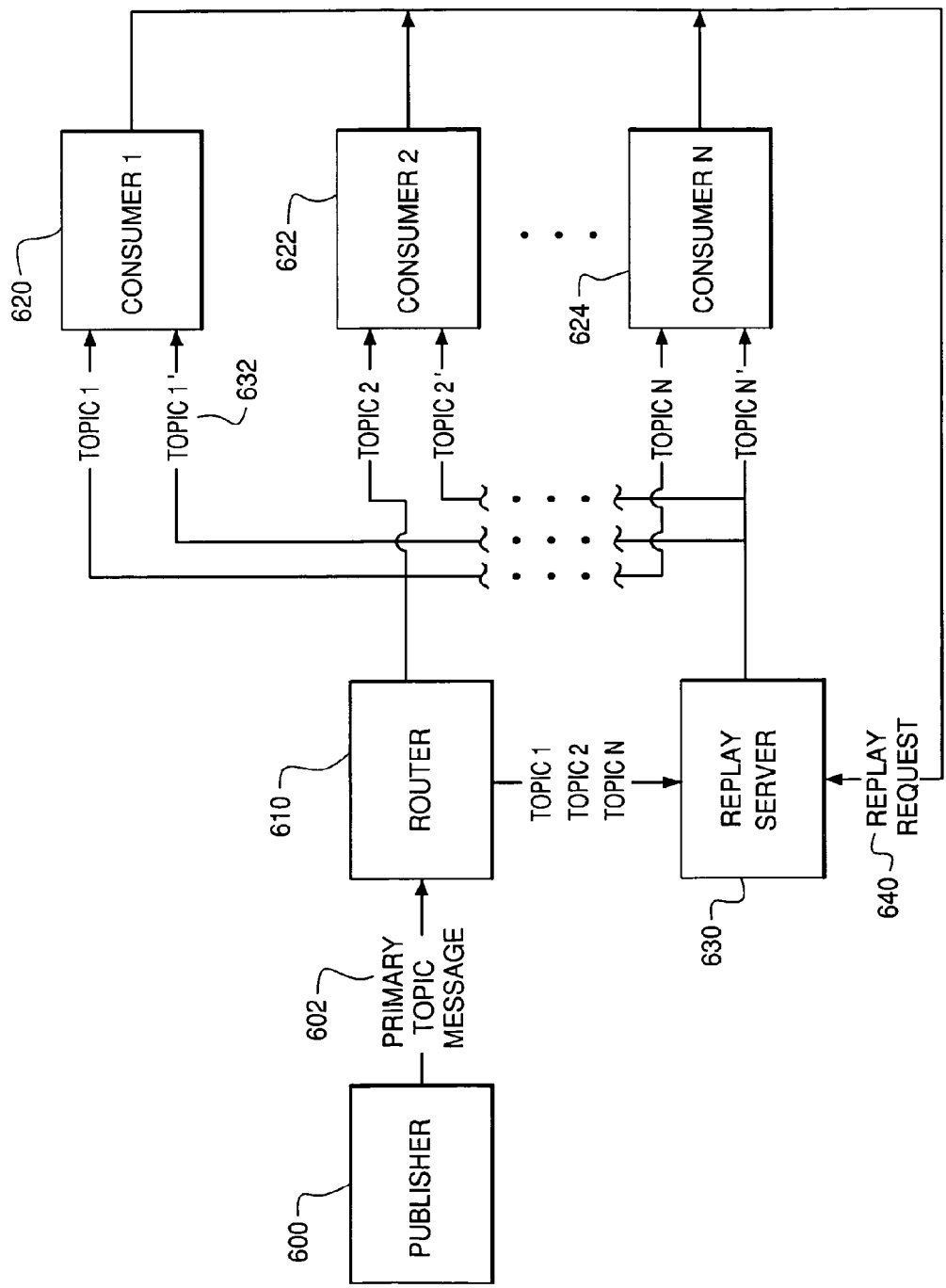
FIG. 6B is a diagram of a further embodiment of a message replay scheme of the routing system according to the present invention.

FIGS. 6A and 6B show overviews of preferred embodiments of message replay procedures that may be executed by the routing system according to the invention. As seen in each if those figures, at least one publisher 600 publishes "primary topic" messages 602 to a router 610. The router 610 processes the messages 602 and publishes the messages to a first topic (Topic 1), a second topic (Topic 2), up to an Nth topic (Topic N), the total number of topics being flexible, as in any messaging system. The topics are subscribed to by a first consumer 620, a second consumer 622, up an Nth consumer 624, with the total number of consumers also being flexible. It will be understood that there may not necessarily be a one-to-one correspondence between topics and consumers, although it is illustrated herein as such for simplicity of illustration and description. As used herein, the terms "consumer(s)" and "subscriber(s)" are interchangeable and refer to the destinations to which outbound messages are published by the routing system of the present invention.

The system illustrated in FIGS. 6A and 6B additionally includes a replay server 630. The replay server is a "super consumer" that acts as a source of data capture. It receives and stores all "primary topic" messages on Topic 1, Topic 2, . . . , Topic N that are published by the router 610 and it may be prompted from time-to-time to replay certain ones of those messages. Thus, if something happens downstream between the router 610 and a consumer 620, 622 and/or 624 that causes message delivery problems (for example, if the routing logic is flawed or if another application drops messages), the system according to the invention enables the lost messages to be recovered and redelivered to their proper destinations such that the recovered or "recovery topic" messages can be processed in FIFO fashion by their intended consumers. As depicted in FIGS. 6A and 6B, the recovery topic messages are preferably encoded by either the router 610 or the replay server 630 in such a way that interested consumer(s) recognize them as recovery topic messages rather than as original publications of primary topic messages. This encoding is reflected in FIGS. 6A and 6B by the addition of a prime symbol (') to the primary topics Topic 1, Topic 2, . . . , Topic N, i.e., recovery topic messages comprise the messages on Topic 1', Topic 2', . . . , Topic N'.

It is important to note that in addition to allowing a user of the system to get messages re-published to it, the replay server 630 actually strips certain metadata tags, defined by the user, from the messages. This metadata is stored in the replay database as columnar data along with an image column that represents the message. This allows the users to make so called "smart" queries against a replay graphical user interface ("GUI") to determine what part (subset) of a message flow they want to be re-sent.

A first message recovery scenario is shown in FIG. 6A and may be generally referred to as "router recovery." As described below, router recovery might be deployed on a large scale to recover large amounts of data that might be lost because of harm to the communications infrastructure of a business unit of a distributed enterprise. Alternatively, when a consumer is an end user application, router recovery might also be used to recover on all topics subscribed to by that application. As depicted in FIG. 6A, when router recovery is desired, a consumer 620, 622 and/or 624 sends a replay request 640 to router 610. Once that request is made the replay server 630 picks up the user request and the data from the replay data store and republishes the data on the desired recovery topic through the router 610. In order to consume the desired messages republished through router 610, the user switches off consumption on the topic from the router (i.e., switches off consumption of primary topic messages) while switching on consumption on the topic being published by replay server through the router (i.e., switches on consumption of recovery topic messages) until the queue of desired messages is drained from the replay server. After having consumed the desired recovery topic messages from the recovery server 630 through router 610, the consumer switches back to router consumption on the primary topic and consumes from the router as it did prior to the recovery request. It will be understood that while a consumer is requesting and consuming recovery topic messages, the router otherwise continues to process primary topic messages in the order that they were published by a publisher or publishers 600. This methodology allows a preservation of FIFO ordering.

As far as router 610 is concerned, replay is simply an injection point. That is, the router can publish multiple targets. From the router's perspective, replay is simply another target (although replay has a dedicated adapter in the routing infrastructure that allows direct Java database connectivity ("JDBC") injection of message images and metadata so that the two are very tightly linked). Simply stated, the user requests re-transmission, either full or partial based on the replay GUI while the router facilitates the replay data injection.

A second message recovery scenario is shown in FIG. 6B and may be generally referred to as "replay server recovery." In replay server recovery, an application instance of a consumer 620, 622 and/or 624 submits a replay request 640 directly to the replay server 630 requesting messages on a recovery topic. The requesting consumer application instance is then switched to listen for messages from the replay server 630 on the desired recovery topic Topic 1', Topic 2', . . . , Topic N'. During this time the requesting consumer(s) do not consume primary topic messages on primary topics Topic 1, Topic 2, . . . , Topic N published by the router 610. When the requesting consumer(s) consume the recovery topic messages requested from the replay server 630, the application instance of the requesting consumer(s) is switched to primary topic mode whereby it again listens for messages published by the router 610 on the desired primary topic. Replay server recovery consumes less system resources than router recovery since it does not involve the router in the recovery process. For this reason, replay server recovery is a preferred message recovery method in instances where fine-grained message recovery is sought, i.e., recovery of a relatively limited scope or range of messages.

In addition to assuring FIFO transaction processing, the replay server according to the present invention offers other significant benefits to distributed businesses that have facilities in more than one location. For such businesses, the system according to the invention may be advantageously employed in a peer model wherein the peers of the enterprise are connected by a wide area network (WAN) and wherein each peer is symmetrically equipped with a router 610 and a replay server 630.

Consider, for instance, a brokerage house having a New York peer which primarily brokers transactions on North American stock exchanges, a London peer which primarily brokers transactions on European stock exchanges and a Tokyo peer which primarily brokers transactions on Asian stock exchanges. With the present routing system, there is no need for a centralized router through which all of the messages of the enterprise would have to be routed before being published to their intended consumers. Under normal operating conditions, the general data router of the New York peer would primarily handle the business transactions conducted by the North American business units, the general data router of the London peer would primarily handle the business transactions conducted by the European business units, and the general data router of the Tokyo peer would primarily handle the business transactions conducted by the Asian business units. In this way, WAN massage traffic is significantly reduced and transactions are settled more quickly than they would be if they all had to be first routed through a centralized router.

Additionally, in the peer model herein described, no single router would represent a potential global point of system failure. In this regard, consider a situation where a division, plant, office or other business unit of a distributed enterprise suffers debilitating harm by an act of God, an act of terrorism or war, or other catastrophe. In that event, the replay server of the peer which includes the damaged business unit preserves messages published by the damaged business unit prior to occurrence of the damage. Those messages can be replayed by the replay server to the general data routers of other peers in the network. Thus, the pre-damage transactions may be successfully processed by the other peer(s) in the network. With a messaging system architected as such, the integrity of all messages published by the damaged business unit prior to the occurrence of the damage can be retained and processed by the system.

Broadcast Messages

Any general data router of the routing system of the present invention may publish a broadcast message from any publisher who publishes messages to that router. A broadcast message may be any message that may be of interest to one or more units or one or more peers of a distributed enterprise or even the entire enterprise itself. A broadcast message may be merely informational in nature or it may, as discussed below, serve as an automatic trigger event that that causes some other event(s) to be undertaken by the recipients of the broadcast message. In any case, the router applies a business rule to the broadcast message which identifies the message as a broadcast message whereby the broadcast message is published to all registered listeners on the system.

When a general data router in the routing system according to the present invention is used in a worldwide securities trading environment, for example, that router may be processing trading data twenty four hours a day, seven days a week. In order to properly process messages throughout the system, there needs to be some logical separator that signifies when the end of a business day has been reached. This type of message is called an "end of day" ("EOD") message and is treated as an enterprise-wide event. For example, in the aforementioned peer model of a brokerage house having peers in New York, London and Tokyo, EOD messages are sent daily from the those peers indicating the ends of business days in New York, London and Tokyo, respectively. These EOD events are of interest to every potential consumer connected to the system (i.e., all subscribers on all subjects). The router of the present invention does not route an EOD message like any other message, e.g., to a particular business unit. Instead, the router broadcasts the EOD message to every possible potential pre-registered consumer that the router can publish to.

An EOD message is sent by a publisher signifying that any non-EOD message, e.g., a trade-related message, received by a consumer after the EOD message should be processed on the next business day. This does not mean that the processing of non-EOD messages is delayed until the next calendar day; however the EOD message serves as a logical separator between business days. In that way, the EOD message signifies to its recipients to begin various batch processes or other end of day summaries or tasks that need to be performed at the conclusion of a business day. In a worldwide securities trading environment, an EOD message is necessary because if the system is constantly receiving and processing trading messages, there is no mechanism for the system to be able to determine when the end of a business day has been reached. The EOD message can also be used to shut down certain parts of the system if no further messages will be received by those parts.

Logging

As a message is being processed, there are different levels of logging that can be used. Basically, a user can configure the amount of logging desired. In other words, as a message comes into the routing software, every time it takes a hop (i.e., comes into the message bus application and gets consumed), it gets handed off from there to the routing logic, and from the routing logic it may be handed into some content transformation module. There is the ability to make the log entries more granular, meaning that each step of the progress of a message can be logged. For example, a log entry could read, "Applying Rule #1. Rule #1 has been evaluated and the result is such and such a routing tag."

The reasons for having different levels of granularity is for use in a debugging scenario. If a user has set up some routing logic and is not getting the expected end result, then there is an error in the routing logic. However, it is fairly difficult to debug a piece of multithreaded application software. It is helpful if the user can read a log that basically shows: "The message came in here and went this way and a decision was made at this point and the message went left, not right," so the user knows that that is the decision point that he or she needs to change. It is possible that a particular rule did not evaluate the way the user expected, because some key that was returned was not what was expected. However, in a deployed release, the logging level should be set fairly coarse because of the performance overhead from logging a large number of events. In a scenario where a user is testing or if the user is actually in a failure scenario where and trying to determine what went wrong, the logging should be as granular as possible. Therefore, the user should have the ability to configure logging with high or low granularity.

Logging can be handled in two ways: as a function of a unit of work synchronously or as a function of a unit of work asynchronously. In a preferred embodiment, an asynchronous approach is used, wherein the logging messages are sent to a logger program that is responsible for synchronously logging them through to a file which is ultimately visible by a human being.

It is possible to insert user logic between where the logging messages are generated and where they are written to a logging file that would permit the user to map on a certain pattern for a specified type of error message. It is also possible for the logger program to send an e-mail or a lifeline alert which pages someone. It is possible to associate a profile of errors with an associated action or reaction to the logging process to trigger an alert if a serious error comes through. Using a notification system of this type allows errors to be acted on in a timely fashion, instead of attempting to trace through a log file to determine why an error occurred.

Transaction Integration

When working in an EAI environment, it is important to be able to determine whether a transaction has been successfully completed or if the transaction has failed. In the case of a transaction failure, it is often necessary to redo the transaction in order to complete the work involved. Some difficulty arises when dealing with multiple applications, because a transaction needs to be viewed from a system-wide level in order to be considered to be "complete." In some instances, each application in a system may consider its work to be complete when it finishes its portion of the work and hands the work off to the next application. While this is true, the system as a whole needs to be aware of whether the entire transaction, from start to finish, has been completed.

If there is a transaction failure on a system-wide level (i.e., a failure of a logical unit of work or "LUW"), it is necessary to roll back to the beginning of the transaction so all of the data involved in the transaction can be recovered and the transaction can be restarted. It is irrelevant in the context of an LUW what percentage of the unit of work has failed because it is not possible to recover a percentage of a unit of work. For example, if a message is consumed successfully, but not processed successfully, that message is lost (i.e., it cannot be retrieved from the messaging bus because the messaging bus discarded the message once it was successfully consumed) and cannot be re-evaluated. Being able to recover the lost message is significant, and that is why the control point for the transaction needs to be where the LUW begins. If anything fails between the control point and the commit point for the unit of work (which is guaranteed success of the performance of the unit of work), it is necessary to roll back the entire transaction to the control point so the transaction can be restarted. Placing the control point anywhere other than where the unit of work begins would not permit the unit of work to be restarted in the event of a failure during processing of the unit of work.

In the present invention, an LUW begins when an inbound message is consumed by the router, and ends (commits) when the outbound message is successfully published. Any action taken on the message in between those two points, whether it is routing the message or transforming the message, is part of the LUW. If any of those actions fail, the entire unit of work fails, and the process is restarted from message consumption by the router. By defining the unit of work in this manner, messages will not be lost if a portion of the unit of work fails.

From an EAI perspective, this definition is important because it would be counterintuitive to the entire EAI paradigm to have components of the enterprise software losing messages by not successfully publishing and consuming them.

However, when interacting with disparate messaging systems, transaction management is difficult to do because each messaging system has its own mechanism for knowing when a transaction has been successfully completed. For example, if an inbound message is coming from an ETX messaging bus, and will be published to an IBM MQ Series messaging bus, it is not possible to take the transaction "begin" from ETX and automatically have the ETX transaction "commit" triggered off of the IBM MQ Series "commit." As discussed below, the present invention additionally provides a guaranteed message transaction management system wherein a transaction begins when a message is consumed off a messaging bus (e.g., either an ETX or IBM MQ Series bus) and the whole transaction is committed when that message is successfully published to another bus (either an ETX or IBM MQ Series bus).

Figure 7:
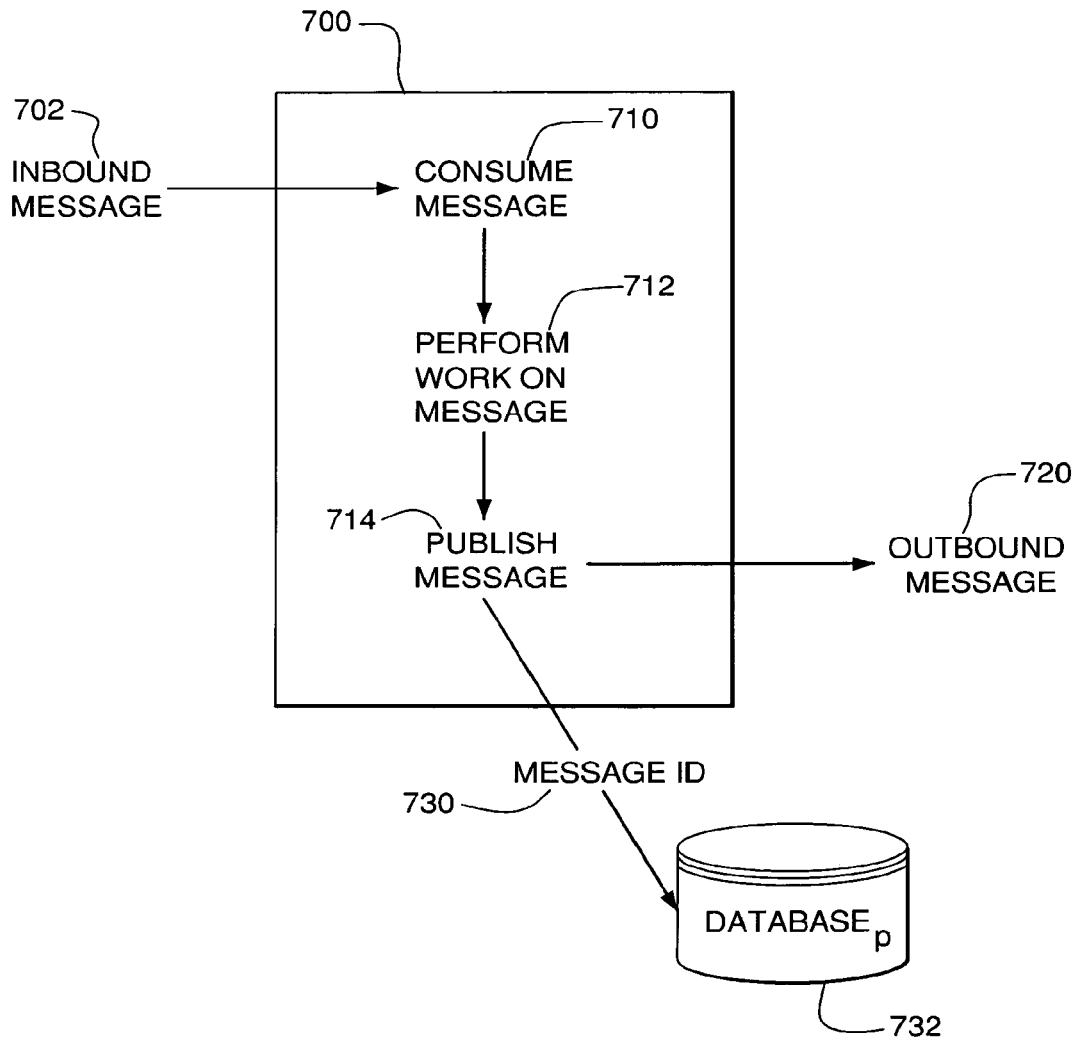
FIG. 7 is a diagram of a first embodiment of a message transaction management scheme of the routing system according to the present invention.

Referring now to FIG. 7, there is illustrated a simplified guaranteed message transaction management system according to the present invention. As shown in that figure, a router 700 consumes an inbound message 702 at step 710. At this point a "begin" for the transaction relating to the inbound message 702 is created. Work is performed on the message 702 at step 712, and the message is published at step 714 as an outbound message 720. Work may be performed on the message by routing, transformation or both. As the outbound message 720 is published, a message identifier 730, preferably a sequence number, is put into a database 732. Preferably, the outbound messages 720 are temporarily cached and are not published immediately. The messages 720 will be published to the outbound messaging bus in a batch, and the batch size can be determined either by a certain number of messages in the batch or after a certain delay between messages being published.

The LUW will be committed when all of the outbound messages 720 in a batch have been published to the outbound messaging bus, and the database 732 will have the message identifier of the last message published. If, between the time that the "commit" is issued on the outbound messages 720 and the time the "commit" is issued for the inbound messages 702 (and thereby completing the unit of work), there is an error or failure and the inbound messages 702 are not committed, then the entire unit of work rolls back to the first inbound message 702 of the unit of work. In the event of an error or a failure, when the router 700 is restarted, the inbound messages 702 will be consumed a second time, beginning with the first message. When the inbound message 702 is to be published as an outbound message 720, the message identifier 730 of the current message is compared to the list of message identifiers stored in the database 732. If the current message was previously published, as indicated by the same message identifier 730 already existing in the database 732, the reconsumed message is discarded and is not published a second time.

Although described as useful for communicating with ETX and IBM messaging buses, the system according to the present invention may accommodate all types of messaging platforms and buses. That is, the client library of a particular messaging platform may provide its own transaction manager or it may use an industry standard known as XA Protocol, which relates to distributed transactions and the coordination of those transactions. In this way the guaranteed message transaction system according to FIGS. 7-10 can successfully execute transactions regardless of the messaging platforms used by the publishers and consumers connected to the system.

Figure 8:
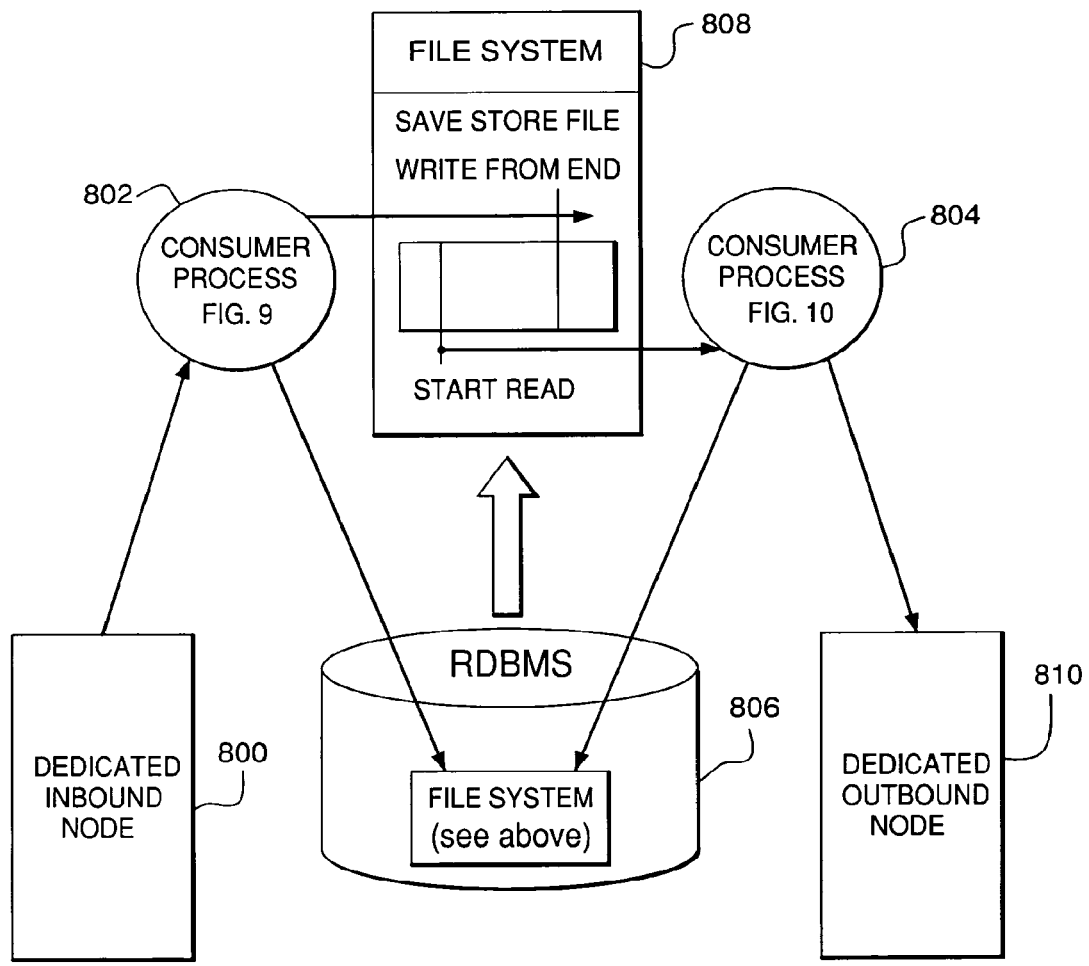
FIG. 8 is a diagram of a further embodiment of a message transaction management scheme of the routing system according to the present invention.
Figure 9:
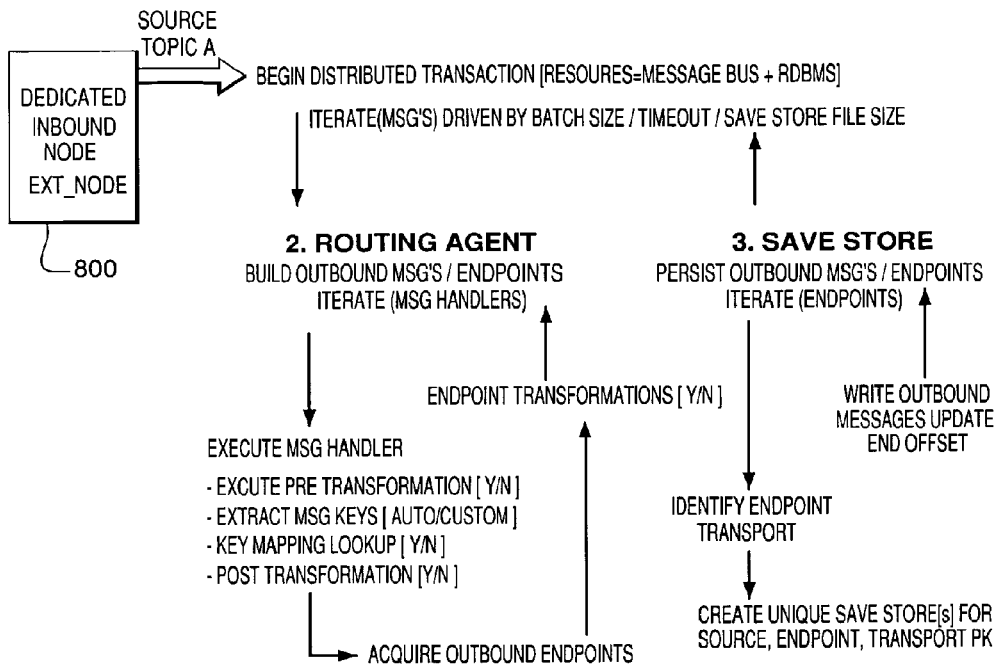
FIG. 9 is a diagram of a first portion of the further embodiment of a message transaction management scheme of FIG. 8, in particular, a preferred multithreaded process for each inbound transport capable of running a consuming thread for each inbound topic/queue.
Figure 9:
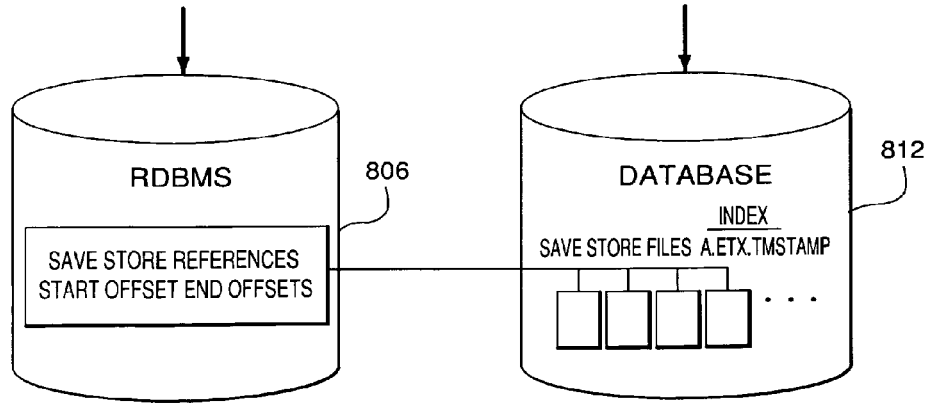
Figure 10:
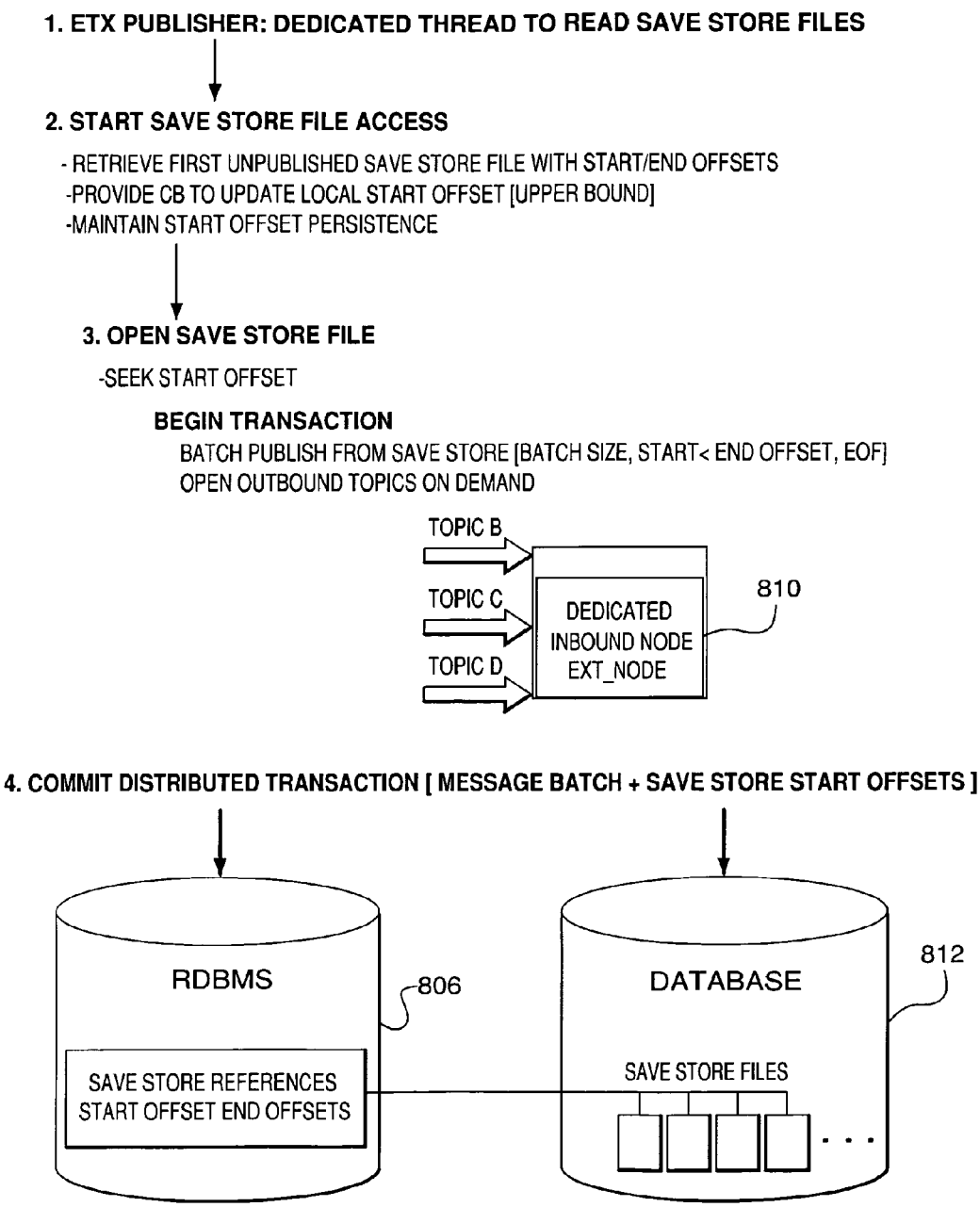
FIG. 10 is a diagram of a second portion of the further embodiment of a message transaction management scheme of FIG. 8, in particular, a preferred multithreaded process for each outbound transport capable of running a publishing thread for each source topic/queue.

FIG. 8 generally illustrates a further embodiment of a message transaction management scheme according to the present invention and FIGS. 9 and 10 provide specific details thereof. The transactional model of FIG. 8 differs from that of FIG. 7 in that the work performed on a message is divided between a consumer process 802 and a publisher process 804 (which processes are described in greater detail in FIGS. 9 and 10, respectively) in such a way as to assure that messages processed by the system are neither lost nor duplicated by either the consumer process or the publisher process when message recovery or replay is required. As shown in FIG. 8, inbound messages are consumed by consumer process 802 from the messaging bus of a dedicated inbound messaging node 800 (e.g., an ETX node). As generally shown in FIG. 8 the messages consumed by the consumer process 802 are worked on by the consumer process and passed to a file system 808 which is in communication with the consumer process 802 and publisher process 804. File system 808 includes a relational database management system ("RDBMS") 806 which may be an RDBMS from Sybase Inc. or other RDBMS vendor. Through file system 808, persistent message files, referred to herein as "save store files," are created and write and read offsets are maintained for message batches that are written to the save store files by the consumer process and that are read from the save store files by the publisher process. The details and advantages of such save store files and message batch offsets are set forth below. As shown in FIGS. 9 and 10, save store files are stored in a database 812 of file system 808 that is managed by RDBMS 806. When a batch of messages has been committed to a save store file, the publisher process 804 reads the messages that have been stored on the database pursuant to batch offsets that have been defined by publisher process and the consumer process. Upon reading of the messages from the appropriate save store file, the publisher process 804 performs certain work on the messages and thereafter publishes those messages to the messaging bus of a dedicated outbound messaging node 810 (e.g., an ETX node) whereby they may be consumed by their intended consumers.

The notion of message batch offsets is graphically depicted in the enlarged "file system" box 808 situated, for clarity of illustration, between the consumer process 802 and the publisher process 804. As instructed by the consumer and publisher processes 802, 804, the file system 808 establishes save store file references including START offsets and END offsets for the save store files committed to the database 812 managed by RDBMS 806. The consumer process 802 establishes the END offset and moves the END offset along until a certain batch of messages has been written to a save store file. The consumer process 802 writes an end offset to the RDBMS 806 after the last message in a batch has been committed to a save store file. Similarly, the publisher process 804 writes a START offset to the RDBMS 806 for each message batch that it reads from a save store file. The publisher process never reads any data before the START offset or after the END offset. Thus, a data "persist" is maintained at all times in the file system 808 whereby everything that is read by the publisher process 804 is transactionally guaranteed by the consumer process 802. It will be understood that a message batch may consist of as few as one message to as many as 1000 or more messages, although a typical batch range according to the present invention is contemplated to be from about 50-100 messages.

As noted above, a routing system occasionally goes down for whatever reason and messages published to the system must be replayed. Without the existence of the START and END offsets shown in FIG. 8, if messages are written by the consumer process 802 to the database 812 and the messaging system is placed into recovery mode, the data placed in the database at the time of recovery would be recognized by the consumer process 802 as being compromised. Accordingly, the consumer process would republish all messages previously written in a batch to the database which would produce duplication of messages previously written by the consumer process to the database. However, if the END offset is properly recorded in the file system 808, then the messages written to the database are transactionally committed by the inbound node 800 and duplicates of those messages will not be resent by the consumer process 802 to the database upon recovery.

Similar to the manner in which the consumer process 802 moves the END offset along before writing the END offset, the publisher process 804 moves the START offset along before writing the START offset. That is, as it reads a batch of messages from a save store file, the publisher process 804 moves the START offset and writes a START offset to the RDBMS 806 for the last message read from the batch. If the START offset is properly recorded in the database, then the publisher process will know where to begin reading messages from the save store file in recovery mode and will not publish duplicate messages.

Referring to FIG. 9, there is shown a detailed schematic of the consumer-side work process performed by a consumer process (such as the consumer process 802 of FIG. 8) in accordance with the further embodiment of the message transaction management scheme of the present invention. The consumer-side work process performs work on messages it consumes from the message bus of a dedicated inbound node 800. Again, for purpose of illustration but not limitation, inbound node 800 is embodied as an ETX node, although it may be a communications node of any presently known or hereinafter developed messaging system.

As generally reflected by Step 1 of FIG. 9, messages from node 800 may be published on a source topic (e.g., Source Topic A) whereby they are consumed by a consumer process via a dedicated ETX thread consuming on Topic A. This marks the beginning of a distributed transaction involving the resources of an RDBMS 806, database 812 and the inbound node message bus. Together, RDBMS 806 and the associated database 812 manifest the file system symbolized by reference numeral 808 of FIG. 8. That is, the RDBMS 806 is a configurational database that manages the save store file references, including the START and END offsets, for the save store files that are stored on database 812. It will be understood, especially by reference to FIG. 10 discussed below, that Source Topic A may comprise messages on several topics, e.g., Topic B, Topic C, Topic D, etc., that are of interest to end consumers that have subscribed to consume messages on one or more of those topics.

At Step 2 of FIG. 9, after the messages are consumed from the inbound node 800, they are passed to a routing agent which builds the outbound messages and identifies their endpoints. This process involves the execution of one or more message handlers (described in greater detail in connection with FIG. 12) which may perform one or more of pre-routing transformation, key extraction, key mapping lookup and post-routing transformation. Outbound message endpoints are then acquired and any requisite endpoint transformations (again described in greater detail in connection with FIG. 12) are performed. Depending on the work to be performed on the messages, the steps of building outbound messages and identifying their endpoints are iterated as necessary by the message handlers.

At Step 3 of FIG. 9, the outbound messages, their END offsets and their endpoint destinations are persisted in the save store files and the save store references of the file system 808 comprised of the database 812 and the RDBMS 806. This process initially involves the identification of the appropriate endpoint transport for a message. This is followed by creation of unique save store file(s) for the source topic, the endpoint and the transport primary key ("PK"). At this time an index, preferably a timestamp representing the time of creation of a save store file, is created for each save store file and stored in database 812. An example of such an index is shown in FIG. 9 superimposed upon database 812 and identified as "A.ETX.TmStamp.P." Following this, the outbound messages are written to the save store file(s) while the END offsets for the messages are correspondingly updated in order to persist this information in the file system. Persistence of outbound messages is iterated as necessary for each of the endpoints for the messages.

The consumer process iterates each of the foregoing steps for each message consumed from the message bus of the inbound node 800 depending on the batch size, timeout range and save store file size(s).

At Step 4 of FIG. 9, the consumer process commits the distributed transaction. It does this by storing the processed message batch in the database 812 and by instructing the RDBMS to save the message END offsets for the batch. As mentioned in connection with the discussion of FIG. 8, proper storage of the END offsets for the messages in a particular batch assures that no messages are republished by the consumer process in the event message replay becomes necessary.

Referring to FIG. 10, there is shown a detailed schematic of the publisher-side work process performed by a publisher process (such as the publisher process 804 of FIG. 8) in accordance with the further embodiment of the message transaction management scheme of the present invention. At Step 1 of FIG. 10, the publisher process begins to read the save store file(s) stored in database 812 via a dedicated ETX thread. At Step 2 of FIG. 10, the publisher process begins a save store file access process for the save store file(s). This process involves retrieving the first unpublished save store file and its associated START/END offsets, executing a callback ("CB") routine to update the local START offset (upper bound) and maintaining START offset persistence.

At Step 3 of FIG. 10, the publisher process opens the save store file by seeking lowest START offset for the file and then begins the publishing transaction. The publishing transaction is begun by batch publishing from the save store file. Batch publishing is a function of the batch size, maintenance of a START offset prior to the END offset for the file and the end of file ("EOF") command associated with the file. The publisher process then opens the topics (e.g., Topic B, Topic C, Topic D) on demand and publishes them to the dedicated outbound node 810 (e.g., an ETX node). It also publishes the outbound messages to an unillustrated replay server having a database similar to database 732 of FIG. 7. Again, for purpose of illustration but not limitation, outbound node 810 is embodied as an ETX node, although it may be a communications node of any presently known or hereinafter developed messaging system.

At Step 4 of FIG. 10, the publisher process commits the distributed transaction. It does this by notifying the RDBMS 806 of the transmission of the message batch to the message bus of the outbound node 810 and by instructing the RDBMS to save the highest START offset for the transmitted batch. As mentioned in connection with the discussion of FIG. 8, storage of the highest START offset for a particular batch assures that no messages are republished by the publisher process in the event message replay becomes necessary.

Figure 11:
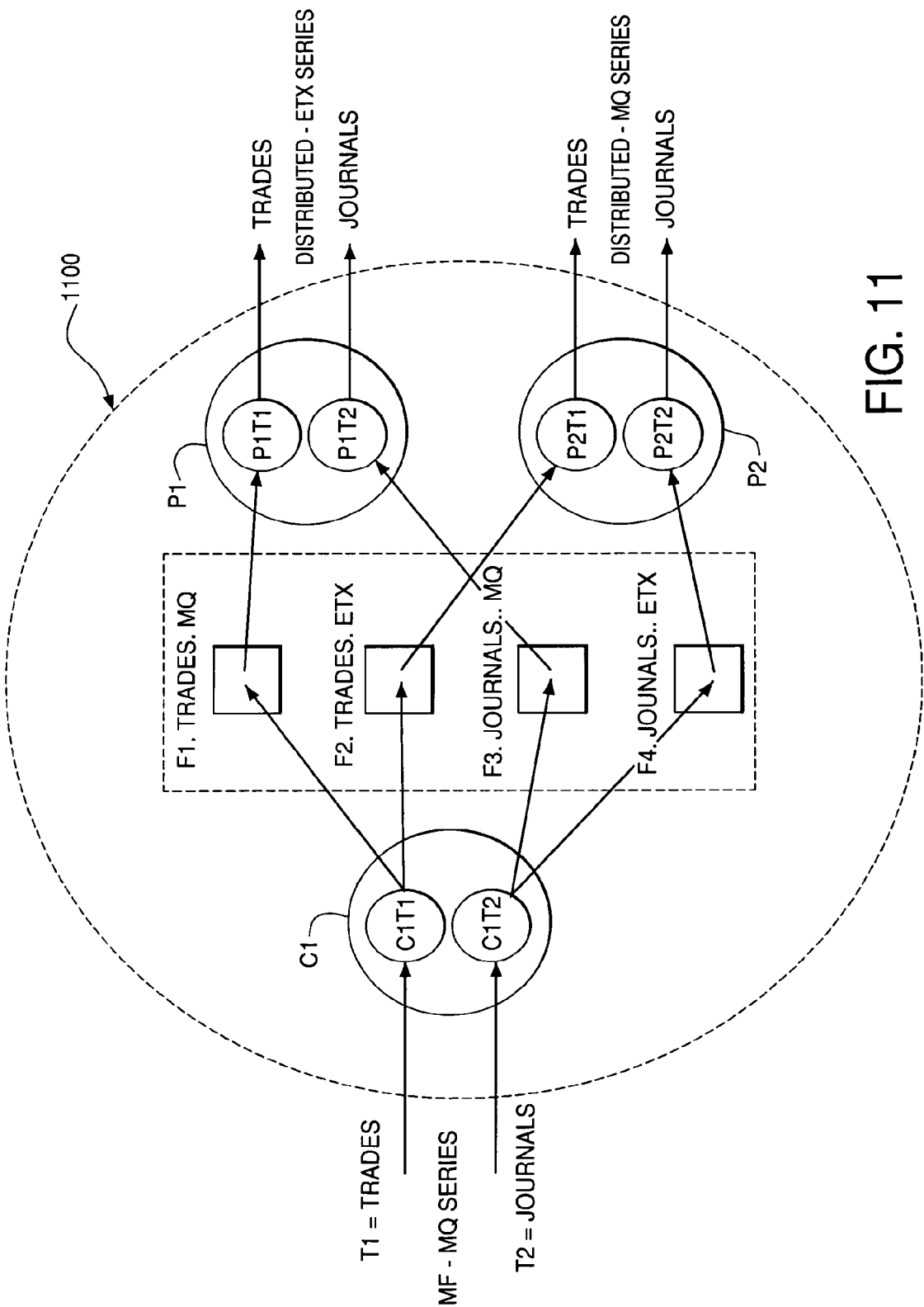
FIG. 11 is a simplified schematic diagram depicting the manner by which the routing system according to the present invention achieves fully scalable multithreaded, multi-topic message consumption, processing and publication.

FIG. 11 is a simplified schematic diagram depicting the manner by which the routing system according to the present invention achieves fully scalable multithreaded, multi-topic message consumption, processing and publication. FIG. 11 reflects one of many possible implementations of the present routing system within an equities trading business enterprise. It will also be understood that the system may be advantageously deployed in any business or other enterprise that uses a messaging scheme over a computer network.

In FIG. 11, reference numeral 1100 generally indicates an instance of the routing system wherein a single consumer process C1 (corresponding to consumer process 802 of FIG. 8) communicates with two publisher processes P1 and P2 (each corresponding to publisher process 804 of FIG. 8). According to the present invention, however, any number of consumer processes may communicate with any number of publisher processes. As illustrated, messages are consumed by consumer process C1 from a messaging bus of a mainframe ("MF") computer operating on an IBM MQ series messaging platform. After routing and other processing, those messages are ultimately published by publisher processes P1 and P2. As shown, publisher process P1 is a distributed user that publishes the messages on an ETX series messaging platform and publisher process P2 is a distributed user that publishes the messages on an MQ series messaging platform. It will be understood that consumer process C1 may be a distributed user and it may operate on a different messaging platform such as ETX. Similarly, publisher processes P1 and P2 may both publish on the same type of messaging platform.

According to the invention, each consumer process deals with only one messaging transport and each publisher process deals with only one messaging transport. That is, the number of consumer processes equals the number of inbound transports, and the number of publisher processes equals the number of outbound transports. An advantage of equating the number of consumer processes and publisher processes with their respective inbound and outbound transports is that the routing system does not have to be concerned with transactionally coordinating work across transports. Also, according to a preferred embodiment of the invention, a formula exists for naming files whereby a part of the file name includes the associated transport for a file. In so doing, a clear separation is maintained between transports and the files in which the transport data resides. It would be more complex if a single publisher process were to read one file and then have to publish a given message from that file to two different transports. Without a one-to-one correspondence between a publisher process and an outbound transport, publication to two or more disparate transactional transports would have to be coordinated with a single row of navigational data in the RDBMS 806. Such a situation can become quite complicated and requires messaging vendors to architect their products to be compatible with one another under XA Protocol, which is an industry standard relating to distributed transactions and the coordination of those transactions.

Further, each consumer process can run a consumer thread and each publisher process can run a publisher thread for each inbound topic/queue. That is, the maximum number of consumer threads equals the number of inbound topics/queues and the maximum number of publisher threads equals the number of inbound topics/queues. For simplicity, two such inbound topics/queues are shown in FIG. 11 and are identified as T1 and T2 (although any number of inbound topics/queues may be accommodated). By way of example, topic/queue T1 relates to trade messages and topic/queue T2 relates to journal messages.

As described in greater detail in regard to FIGS. 8-10 and 12, consumer process C1 includes a message handler that performs routing and message transformation that may be necessary to cause it to write the inbound messages to the publisher processes P1 and P2 via save store files. According to the invention, the number of save store files equals the number of inbound topics/queues times the number of outbound transports. In the present example, therefore, four save store files are created, i.e., files F1.Trades.MQ, F2.Trades.ETX, F3.Journals.MQ and F4.Journals.ETX, because two topics/queues T1 and T2 are handled by the two outbound messaging transports that service the publisher processes P1 and P2.

The real-time message processing demands of large geographically-distributed businesses are substantial and continuously growing. In global securities trading businesses these demands are immense. As mentioned previously, presently available single-threaded messaging systems can accommodate a real-time data flow of about 35 messages per second (assuming an average message size of two kilobytes). In a large stock trading system, a real-time flow of data easily exceeds 35 messages per second. Using the present routing system, multiple threads of the system can be instantiated on single or multiple machines whereby topics/queues may be split among the multiple threads to optimize the number of threads needed to accommodate high volume message throughput in real time. Indeed, the present multithreaded system is capable of processing at least 100 logical units of work per second and therefore finds beneficial application in enterprises where real-time message processing demands are greatest.

Message Transformation and Transport Transformation

The message handler of the routing system of the present invention is an extensible piece of code, and plug-ins can be utilized to expand its functionality. This concept is particularly relevant when dealing with a variety of message formats. Because a router is only as intelligent as it is programmed to be, it needs to be able to process messages that enter and exit the router in different and changing formats.

Through cooperative efforts of publishers and consumers in the intended communication space, business logic is programmed into the router of the present invention by configuring the routing rules and introspection module. The specific information the router is looking for in a message is provided by the introspection module (a part of a logical unit of work which also does optional mapping of the routing keys to routing target(s) using a mapping table and makes routing decisions based on the routing target(s)).

A message can also be transformed as part of the application of complex routing logic. In such circumstances, the router may pass the message to a customer plug-in that transforms the message and returns the message to the router in the new format. Because such transformation is called for by the user, the user's routing logic needs to be aware of the format of the message to be processed. It is possible for a message to be evaluated against a first rule in one format, and evaluated against a second rule in a different format. To guard against an error condition, the explosion module of the second rule would need to be aware that the message is in a different format than that used in applying the first rule.

Figure 12:
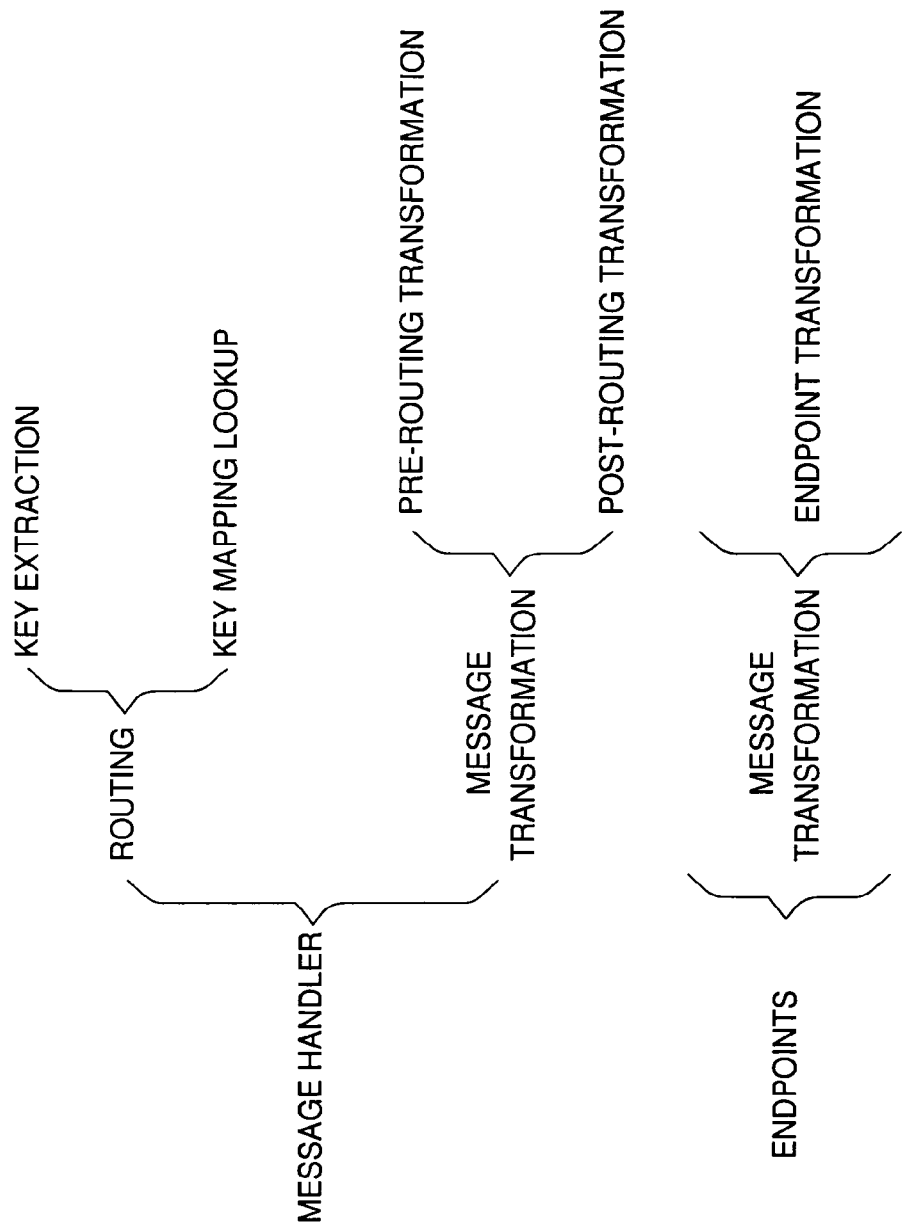
FIG. 12 is an overview of the message routing and transformation functions of the of the routing system according to the present invention.

FIG. 12 provides an overview of the message routing and transformation functions of the routing system according to the present invention. As seen in that figure, a message handler performs routing and message transformation. As described above, routing typically includes key extraction and key mapping lookup. Message transformation may involve pre-routing transformation and post-routing transformation. In pre-routing transformation, a message is transformed or rules are applied to the message before routing in order to, for example, transform the message into a desired format that is understandable by the endpoint consumer(s) of the message. The consumer, in turn, supplies the tags necessary to enable the router to then perform routing of the transformed message. In post-routing transformation, a message is first routed and then is transformed by the router prior to consumption by the end consumer. Endpoint transformations are transformations that heretofore have been performed by endpoint subscribers in order to consume outbound messages following routing.

Endpoint subscribers may instruct the routing system of the present invention to perform message transformation based on a certain publishing topic name. According to the present invention, once the message transformation requirements for such a transformation are made known to the present routing system, the message handler can perform the necessary transformation as part of its message handling procedure.

It also possible for endpoint users of the system that desire to consume messages in formats previously unrecognized by the routing system of the present invention to instruct the system to perform message transformation on messages so that they can be consumed by the endpoint users in the new formats. As reflected in FIG. 12, such message transformation may generally be referred to as endpoint transformation. For example, a producer or publisher of information may be publishing information in a proprietary format and two target systems may be listening to the router, wherein one of the listeners may be a legacy system that can consume the information in the proprietary format and the other listener may be a new system that can consume information only in a different or new format. With the concept of endpoint transformation, an end user or target listening to the router in a previously unrecognized format can cause the present routing system to perform post-routing transformation on future messages based on the needs of the new listener system.

The foregoing is especially useful for migrating the endpoint transformations of new listeners into message transformations that can be performed directly by the message handler. That is, when the common endpoint transformation procedures of a new group of target instances or endpoint subscribers are identified, the endpoint transformations formerly performed by those new target instances become post-routing transformations that can be automatically performed by the message handler when all new users that consume messages in the new format(s) have made the system aware of their need to consume messages in the new format(s).

Conversely, similar to the way in which the present routing system may migrate new endpoint transformations into the routing system as post-routing transformations, it may also be used to migrate from old, obsolete or otherwise undesirable publisher and listener messaging formats. That is, when a messaging format falls into disfavor as a standard messaging format or is used by a decreasing number of listeners in a messaging system that employs the present routing system, the routing system may be easily configured to migrate from the unwanted messaging format.

The present routing system also caches and maintains metadata on a rule-by-rule basis whereby end applications may continuously revise the metadata. For example, a mapping operation may be configured to be part of a particular message handler. Accordingly, the mapping table information will be loaded, (cached) into process memory at the process initialization state. If an end application indicates to the system that the data associated with a particular keymap is stale, the end application can instruct the system to update that data. In order to handle the data update request all routing will be paused and a special routine (usually provided by the end user) will be called to reload the mapping information from some resource external to the end user source (e.g., a file or a database).

The present routing system is thus able to readily update its existing routing functions, incorporate new message transformations and message formats, and migrate from undesirable message transformations and message formats. Consequently, the present system is capable of performing highly complex routing/transformation functions and is extremely adaptable to an enterprise's evolving messaging needs.

It will be understood that the embodiments of the invention described herein are merely exemplary and that a person skilled in the art may make many variations and modifications without departing from the spirit and scope of the present invention. All such variations and modifications are intended to be included within the scope of the invention as defined in the appended claims.

What is claimed is:

1. A computerized message routing system comprising:
   at least one inbound transport node in communication with at least one consumer process that runs via a processor at least one consumer thread for each inbound message topic; and
   at least one outbound transport node in communication with at least one publisher process that runs via the processor at least one publisher thread for each inbound message topic,
   wherein the at least one consumer process communicates with the at least one publisher process via at least one message file,
   wherein the at least one consumer process communicates with at least one inbound messaging bus,
   wherein the at least one publisher process communicates with at least one outbound messaging bus,
   wherein the at least one consumer process includes a message handler for performing message and routing transformations,
   wherein the number of consumer processes equals the number of inbound transport nodes,
   wherein the number of publisher processes equals the number of outbound transport nodes,
   wherein the maximum number of consumer threads equals the number of inbound message topics,
   wherein the maximum number of publisher threads equals the number of inbound message topics, and
   wherein the number of message files equals the number of inbound topics times the number of outbound transport nodes.

2. A method for operating a computerized message routing system, comprising:
   providing at least one inbound transport node in communication with at least one consumer process that runs via a processor at least one consumer thread for each inbound message topic;
   providing at least one outbound transport node in communication with at least one publisher process that runs via the processor at least one publisher thread for each inbound message topic; and
   communicating with the at least one consumer process with the at least one publisher process via at least one message file,
   wherein the at least one consumer process communicates with at least one inbound messaging bus,
   wherein the at least one publisher process communicates with at least one outbound messaging bus,
   wherein the at least one consumer process includes a message handler for performing message and routing transformations,
   wherein the number of consumer processes equals the number of inbound message transport nodes,
   wherein the number of publisher processes equals the number of outbound message transport nodes,
   wherein the maximum number of consumer threads equals the number of inbound message topics,
   wherein the maximum number of publisher threads equals the number of inbound message topics, and
   wherein the number of message files equals the number of inbound topics times the number of outbound transport nodes.

3. The system of claim 1, wherein the at least one consumer process consumes messages via an IBM MQ messaging platform.

4. The system of claim 1, wherein the at least one consumer process consumes messages via a TIBCO ETX messaging platform.

5. The system of claim 1, wherein the at least one publisher process consumes messages via an IBM MQ messaging platform.

6. The system of claim 1, wherein the at least one publisher process consumes messages via a TIBCO ETX messaging platform.

7. The system of claim 1, wherein the at least one consumer process passes the at least one message file to a file system maintained by a relational database management system.

8. The method of claim 2, wherein the at least one consumer process consumes messages via an IBM MQ messaging platform.

9. The method of claim 2, wherein the at least one consumer process consumes messages via a TIBCO ETX messaging platform.

10. The method of claim 2, wherein the at least one publisher process consumes messages via an IBM MQ messaging platform.

11. The method of claim 2, wherein the at least one publisher process consumes messages via a TIBCO ETX messaging platform.

12. The method of claim 2, wherein the at least one consumer process passes the at least one message file to a file system maintained by a relational database management system.

* * * * *